US008068053B1

(12) United States Patent
Stutzke et al.

(10) Patent No.: US 8,068,053 B1
(45) Date of Patent: Nov. 29, 2011

(54) LOW-PROFILE LENS METHOD AND APPARATUS FOR MECHANICAL STEERING OF APERTURE ANTENNAS

(75) Inventors: Nathan A. Stutzke, Westminster, CO (US); Mark C. Leifer, Boulder, CO (US); Bradley J. Tame, Thornton, CO (US); Dean A. Paschen, Lafayette, CO (US); Kiersten Kerby, Somerville, MA (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 170 days.

(21) Appl. No.: 12/638,782

(22) Filed: Dec. 15, 2009

Related U.S. Application Data

(63) Continuation of application No. 11/452,712, filed on Jun. 13, 2006, now Pat. No. 7,656,345.

(51) Int. Cl.
*G01S 7/28* (2006.01)

(52) U.S. Cl. ............ 342/75; 342/81; 342/368; 343/753; 343/754

(58) Field of Classification Search .......... 342/368–372, 342/399, 74, 75, 81; 343/753, 754, 909, 343/756, 757, 768, 772, 776, 777, 876; 359/298, 359/302–304
See application file for complete search history.

(56) References Cited

U.S. PATENT DOCUMENTS

| | | | |
|---|---|---|---|
| 2,571,129 | A | 10/1951 | Hansen |
| 2,617,029 | A | 11/1952 | Plummer et al. |
| 2,810,905 | A | 10/1957 | Barlow |
| 2,887,684 | A | 5/1959 | Dexter et al. |
| 2,994,873 | A | 8/1961 | Goubau |
| 3,066,291 | A | 11/1962 | Alford |
| 3,072,905 | A | 1/1963 | Wilkes |
| 3,226,658 | A | 12/1965 | Bowman |
| 3,226,721 | A | 12/1965 | Gould |
| 3,309,701 | A | 3/1967 | Bollinger et al. |
| 3,852,748 | A | 12/1974 | Stark |
| 3,852,761 | A | 12/1974 | Bogner |
| 3,979,755 | A | 9/1976 | Sandoz et al. |
| 4,217,587 | A | 8/1980 | Jacomini |
| 4,504,835 | A | 3/1985 | Howard et al. |
| 4,595,926 | A | 6/1986 | Kobus et al. |
| 4,860,023 | A | 8/1989 | Halm |
| 4,965,603 | A | 10/1990 | Hong et al. |
| 5,001,494 | A | 3/1991 | Dorman et al. |
| 5,065,165 | A | 11/1991 | Blaisdell |
| 5,161,059 | A | 11/1992 | Swanson et al. |
| 5,210,542 | A | 5/1993 | Pett et al. |
| 5,278,028 | A | 1/1994 | Hadimioglu |

(Continued)

OTHER PUBLICATIONS

Sheng-Hong Yan and Tah-Hsiung Chu, Grad. Inst. of Commun. Eng., Nat. Taiwan Univ., Taipei, “A Single-Element Beam Steering Antenna Array with 180 Degree Scanning Range”, IEEE Proceedings of Asia-Pacific Microwave Conference (2007).

(Continued)

*Primary Examiner* — John B Sotomayor
(74) *Attorney, Agent, or Firm* — Sheridan Ross P.C.

(57) ABSTRACT

A low-profile lens element for steering a beam is provided. Specifically, the low-profile lens element is mechanically rotatable such that a beam can be steered in any direction within three-dimensional space. The lens element may include a number of discrete portions for differentially delaying adjacent discrete portions of a beam in order to effect beam steering. These discrete portions may vary in width. In addition, multiple lens elements may be provided.

20 Claims, 16 Drawing Sheets

U.S. PATENT DOCUMENTS

| | | | |
|---|---|---|---|
| 5,351,250 | A | 9/1994 | Scott |
| 5,365,243 | A | 11/1994 | Buchler et al. |
| 5,432,524 | A | 7/1995 | Sydor |
| 5,543,809 | A | 8/1996 | Profera, Jr. |
| 5,619,215 | A | 4/1997 | Sydor |
| 5,633,695 | A | 5/1997 | Feke et al. |
| 5,673,056 | A | 9/1997 | Ramanujam et al. |
| 5,675,349 | A | 10/1997 | Wong |
| 5,708,679 | A | 1/1998 | Fernandes et al. |
| 5,764,199 | A | 6/1998 | Ricardi |
| 5,929,819 | A | 7/1999 | Grinberg |
| 5,940,030 | A | 8/1999 | Hampel et al. |
| 5,945,946 | A | 8/1999 | Munger |
| 5,982,333 | A | 11/1999 | Stillinger et al. |
| 5,990,836 | A | 11/1999 | Bhattacharyya |
| 6,002,818 | A | 12/1999 | Fatehi et al. |
| 6,031,501 | A | 2/2000 | Rausch et al. |
| 6,111,542 | A | 8/2000 | Day et al. |
| 6,262,688 | B1 | 7/2001 | Kasahara |
| 6,285,323 | B1 | 9/2001 | Frank |
| 6,313,802 | B1 | 11/2001 | Petersson |
| 6,351,247 | B1 | 2/2002 | Linstrom et al. |
| 6,400,328 | B1 | 6/2002 | Falk |
| 6,462,718 | B1 | 10/2002 | Ehrenberg et al. |
| 6,492,955 | B1 | 12/2002 | Amyotte et al. |
| 6,507,319 | B2 | 1/2003 | Sikina |
| 6,556,174 | B1 | 4/2003 | Hamman et al. |
| 6,587,076 | B2 | 7/2003 | Fujii et al. |
| 6,720,931 | B1 | 4/2004 | Michisaka et al. |
| 6,738,024 | B2 | 5/2004 | Butler et al. |
| 6,774,862 | B2 | 8/2004 | Mizuno et al. |
| 6,822,614 | B2 | 11/2004 | Chiu |
| 6,822,622 | B2 | 11/2004 | Crawford et al. |
| 6,825,814 | B2 | 11/2004 | Hayes |
| 6,825,815 | B1 | 11/2004 | Harmon |
| 6,829,439 | B1 | 12/2004 | Sidorowich et al. |
| 6,870,512 | B2 | 3/2005 | Yoneda et al. |
| 6,873,289 | B2 | 3/2005 | Kwon et al. |
| 6,897,828 | B2 | 5/2005 | Boucher |
| 6,919,854 | B2 | 7/2005 | Milroy et al. |
| 6,924,923 | B2 | 8/2005 | Serati et al. |
| 7,042,409 | B2 | 5/2006 | Desargant et al. |
| 7,183,988 | B2 | 2/2007 | Piltonen |
| 7,193,574 | B2 | 3/2007 | Chiang et al. |
| 7,212,169 | B2 | 5/2007 | Ogawa et al. |
| 7,212,170 | B1 | 5/2007 | Dean et al. |
| 7,250,908 | B2 | 7/2007 | Lee |
| 7,259,724 | B2 | 8/2007 | Young et al. |
| 7,301,504 | B2 | 11/2007 | Howell |
| 7,373,127 | B2 | 5/2008 | Reed |
| 7,382,329 | B2 | 6/2008 | Kim |
| 7,427,962 | B2 | 9/2008 | Yang |
| 7,463,191 | B2 | 12/2008 | Dybdal et al. |
| 7,463,214 | B2 | 12/2008 | Winsor et al. |
| 7,466,285 | B2 | 12/2008 | Lin et al. |
| 7,468,706 | B2 | 12/2008 | Andersson et al. |
| 7,656,345 | B2 * | 2/2010 | Paschen et al. ................ 342/75 |
| 2001/0022560 | A1 | 9/2001 | Hirtzlin et al. |
| 2002/0089462 | A1 | 7/2002 | Monzon |
| 2002/0109638 | A1 | 8/2002 | Solbach |
| 2002/0167449 | A1 | 11/2002 | Frazita et al. |
| 2003/0006941 | A1 | 1/2003 | Ebling et al. |
| 2007/0285327 | A1 | 12/2007 | Paschen et al. |

OTHER PUBLICATIONS

Sanghyo Lee et al., Sch. of Electr. Eng., Seoul Nat. Univ., "V-Band Single-Platform Beam Steering Transmitters Using Micromachining Technology", Microwave Symposium Digest, 2006 IEEE MTT-S International, pp. 148-151 (2006).

No-Weon Kang, Changyul Cheon, and Hyun-Kyo Jung, "Feasibility Study on Beam-Forming Technique with 1-D Mechanical Beam Steering Antenna Using Niching Genetic Algorithm", IEEE Microwave and Wireless Components Letters, vol. 12, No. 12, pp. 494-496 (2002).

Chang-Wook Baek et al., Sch. of Electr. Eng. & Comput. Sci., Seoul Nat. Univ., "2-D Mechanical Beam Steering Antenna Fabricated Using MEMS Technology", Microwave Symposium Digest, 2001 IEEE MTT-S International, vol. 1, pp. 211-214 (2001).

C. Thongsopa et al., Fac. of Eng., King Mongkut's Inst. of Technol., Bangkok, "A Single Patch Beam Steering Antenna", Microwave Conference, 2000 Asia-Pacific, pp. 1510-1513 (2000).

Schwartzman, Leon and Topper, Leo, "Analysis of Phased Array Lenses" IEEE Transactions on Antennas and Propagation, vol. AP-16, No. 6, Nov. 1968, pp. 623-632.

Official Action for U.S. Appl. No. 11/452,712, mailed May 11, 2009, 6 pages.

Notice of Allowance for U.S. Appl. No. 11/452,712, mailed Sep. 17, 2009, 6 pages.

* cited by examiner

LOW-PROFILE LENS METHOD AND APPARATUS FOR MECHANICAL STEERING OF APERTURE ANTENNAS

CROSS-REFERENCE TO RELATED APPLICATIONS

This application is a continuation-in-part of U.S. patent application Ser. No. 11/452,712, filed Jun. 13, 2006, the entire disclosure of which is hereby incorporated herein by reference.

FIELD

The present invention is directed to a method and apparatus for steering a beam. More specifically, the present invention provides a mechanically steered lens assembly having discrete portions for effecting a change in the direction of an antenna beam.

BACKGROUND

Many communication systems require a low profile aperture antenna that can be easily conformed to an existing structure such as the skin of an aircraft, inside a moving vehicle, or concealed beneath a surface, and that can provide a steered beam. In the past, monolithic microwave integrated circuit (MMIC) or other electronically scanned or steered planar phased arrays have been used for such applications because they provide a low profile aperture. The usual reasons why a consumer may choose an electronic phased array include the phased array's ability to provide high speed beam scanning and meet multi-beam/multi-function requirements.

Unfortunately, there are several disadvantages associated with implementing an electronically steered phased array. The most notable disadvantage is that electronically steered phased arrays are very costly since the amplitude and phase at each point in the aperture is controlled discretely. The active circuit elements required to operate such an array are complex, costly and susceptible to failure. Due to this high cost, commercial exploitation of electronically steered phased arrays has been limited. Rather, the use of electronically steered phased arrays is basically confined to military and other government programs where minimizing costs are not necessarily of the highest priority. However, for most commercial applications mitigating costs is a high priority when implementing antennas or other communication devices.

An alternative to electronically steered phased array antennas is a mechanically steered scanning antenna utilizing admittance plates. These admittance plate antennas produce a directional beam by differentially rotating two, co-axial, flat admittance plates relative to each other. Some admittance plates are designed to efficiently pass incident, circularly-polarized, radio frequency energy (i.e. a beam) through them while imparting a phase shift to the beam. The direction of travel of the beam is typically changed from its original direction to a new, different direction when the phase of the beam is changed. Although, admittance plate antennas provide a viable option to antenna consumers requiring a low profile, relatively low-cost antenna capable of steering a beam, admittance plate antennas have several shortcomings associated therewith. For example, admittance plate antennas can only produce a small phase shift to the beam over the passband of the beam. This means that admittance plate antennas cannot steer a beam to extreme angles relative to the antenna. In order to steer the beam to wider angles, multiple admittance layers are used for each plate. Moreover, some admittance plate antennas are polarization dependent, meaning that the admittance plate can only impart phase changes to beams having a particular polarization. Thus, while admittance plate antennas provide a low cost alternative to electronically steered phased arrays, the admittance plate antennas sacrifice much in the way of performance.

Still another type of antenna capable of providing a steered beam is a mechanically steered directional antenna, such as a mechanically steered dish. However, such antennas have a relatively high profile, and are therefore unsuitable for applications requiring a low-profile antenna.

For these reasons, there exists a need for a method and apparatus that provides a relatively inexpensive, reliable, and low profile antenna displaying high quality beam steering capabilities.

SUMMARY

The present invention is directed to solving these and other problems and disadvantages of the prior art. In accordance with embodiments of the present invention, a mechanically steered lens assembly for an antenna is provided. More particularly, a mechanism for mechanically steering a received radio frequency beam is provided with at least one lens element comprising at least first and second discrete portions. The first discrete portion is operable to delay a first portion of a beam by a first amount, and then transmit that portion of the beam. The second discrete portion is operable to delay a second portion of the beam that is adjacent to the first portion by a second amount, and then transmit that portion of the beam. By delaying adjacent portions of a beam by different amounts, the relative phase between the first and second portions of the beam is delayed, and therefore the direction of travel of the beam is changed. In accordance with embodiments of the present invention, portions may be provided in sets or sections that are repeated across the area of a lens element. The direction in which the beam is pointed relative to the direction of the received beam can be controlled by rotating the lens element. Furthermore, a beam can be pointed in any direction by using first and second lens elements that can be selectively rotated.

In accordance with at least one embodiment of the present invention, a stepped dielectric lens may be employed to steer a beam. The first portion of the lens differs from the second portion of the lens in that the time it takes a beam to travel through different portions of the lens differs. This feature may be accomplished by providing a single dielectric material (i.e. porcelain (ceramic), mica, glass, plastics, and oxides of various metals) that has a first thickness in the first portion and a second thickness in the second portion. The difference in thickness of the dielectric material introduces a difference in the relative phase of different portions of an incident beam. This causes a relative delay between the portions of the beam and translates to a phase shift of the beam, which in turn causes the beam to change its direction of travel or orientation.

In accordance with at least one embodiment of the present invention, the lens assembly comprises back-to-back radiating elements that can be employed to cause a phase shift in a received beam. A first portion of the lens may include a first passive radiating element and a second passive radiating element separated by a ground plane and connected to one another by a first transmission line. A second portion of the lens may include a third passive radiating element and a fourth passive radiating element separated by a ground plane and connected to one another by a second transmission line. The first and second transmission lines are of different lengths. The first radiating element is operable to receive a first portion of the beam and transmit the received first portion through the first transmission line to the second radiating element. Likewise, the third radiating element is operable to receive a second portion of the beam and transmit the received second portion through the second transmission line to the fourth radiating element. Because the first and second transmission lines have different lengths, the first portion may be delayed relative to the second portion (or vice versa). The delay between the first and second portions effects a phase change in the beam and therefore changes the direction of travel or orientation of the beam.

An advantage offered by utilizing a mechanically steered lens assembly with lens elements having discrete portions is that the profile of the completed antenna assembly can be kept relative low, for example as compared to a mechanically steered dish or other common directional antenna. An additional advantage is that costs can be much lower than an electronically steered phased array antenna. In addition, a relatively wide range of steering angles can be provided by a lens assembly as disclosed. For example, a lens assembly in accordance with at least some embodiments of the present invention can steer an incident beam by up to about 90 degrees. However, it should be noted that beam steering of about 60 degrees is preferable in most situations.

Additionally, the mechanically steered lens assembly of embodiments of the present invention is not necessarily polarization dependent. Rather, the lens assembly can be configured to receive and/or transmit beams having any polarization (linear, elliptical, or circular) including simultaneous dual orthogonal polarization.

In accordance with at least one embodiment of the present invention, the back-to-back radiating elements may comprise passive spiral-radiating elements. With the use of spiral-radiating elements, portions of a circularly polarized beam can be differentially delayed by providing a first set of back-to-back elements rotated relative to each other by a first amount and a second set of back-to-back elements rotated relative to each other by a second amount. As a first portion of the circularly polarized beam strikes the first set of elements it has to travel a first distance due to its polarization. Similarly, a second portion of the circularly polarized beam that strikes the second set of element has to travel a second distance due to the differences in rotation of the first and second elements. Thus, a phase delay can be imparted on a circularly polarized beam.

In accordance with further embodiments of the present invention, the lens elements may incorporate discrete portions or zones that differ from one another in their extent. More particularly, the discrete portions may be configured so that each discrete portion imparts the same amount of beam steering. However, when considered in profile, each discrete portion may differ in width from at least one other discrete portion of the lens.

In accordance with still other embodiments of the disclosed invention, the radiating element or feed is tilted in elevation and is mounted on a base that rotates in azimuth. One or more rotating lenses are mounted in front of the radiating element or feed. In accordance with embodiments of the present invention, the lenses are also tilted in elevation.

In accordance with at least one embodiment of the present invention, a method of steering a beam is provided. The method includes the steps of receiving a first beam having a first direction of travel at a first lens. Thereafter, the first discrete portion of the beam is delayed by a first amount while the second discrete portion of the beam is delayed by a second amount that differs from the first amount, to effect a change in the relative phase of the first and second portions. The beam is then transmitted in a second direction of travel that differs from the first direction of travel.

As used herein, a discrete portion of a lens or a beam is defined by a spatial area. A beam and/or a lens may be divided into at least two discrete portions, each of which delay the transmission of a received beam by a different amount, thereby causing a phase shift of the entire beam. In accordance with at least some embodiments, a lens is divided into four discrete portions such that each antenna layer can impart 30 degrees of beam steering. Thus, a pair of lens elements can impart a total of 90 degrees of beam steering, due to the sine-weighted nature of the phase delay, resulting in a maximum steering angle relative to the axis of the beam.

Additional features and advantages of the present invention will become more readily apparent from the following detailed description, particularly when taken together with the accompanying drawings.

DETAILED DESCRIPTION

The present invention is directed to a mechanically steered lens and/or antenna assembly. In connection with embodiments of the present invention, different delays are imparted on adjacent portions of a beam to effect a change in the relative phase of the adjacent portions such that the direction of travel or orientation of the beam is changed after it is received and subsequently transmitted by the lens assembly.

Figure 1A:
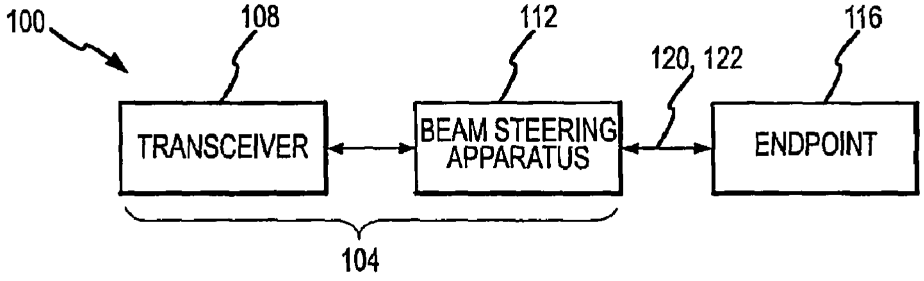
FIG. 1A is a block diagram depicting at a high level the components of a system incorporating a mechanically steered lens assembly in accordance with embodiments of the present invention.

FIG. 1A illustrates components of a system 100 in accordance with embodiments of the present invention. In general, the system 100 includes an antenna assembly 104 that includes a transceiver 108 and a beam steering apparatus comprising a mechanically steered lens assembly 112. In general, embodiments of the antenna assembly 104 are capable of steering a beam 120 produced by the transceiver 108 to an endpoint 116 by imparting a differential phase shift across at least portions of a transmitted beam using the mechanically steered lens assembly 112. Alternatively, or in addition, embodiments of the antenna assembly 104 are capable of directing a beam 122 received from an endpoint 116 to the transceiver 108 by imparting a differential phase shift across at least portions of a received beam 122 using the mechanically steered lens assembly 112.

Figure 1B:
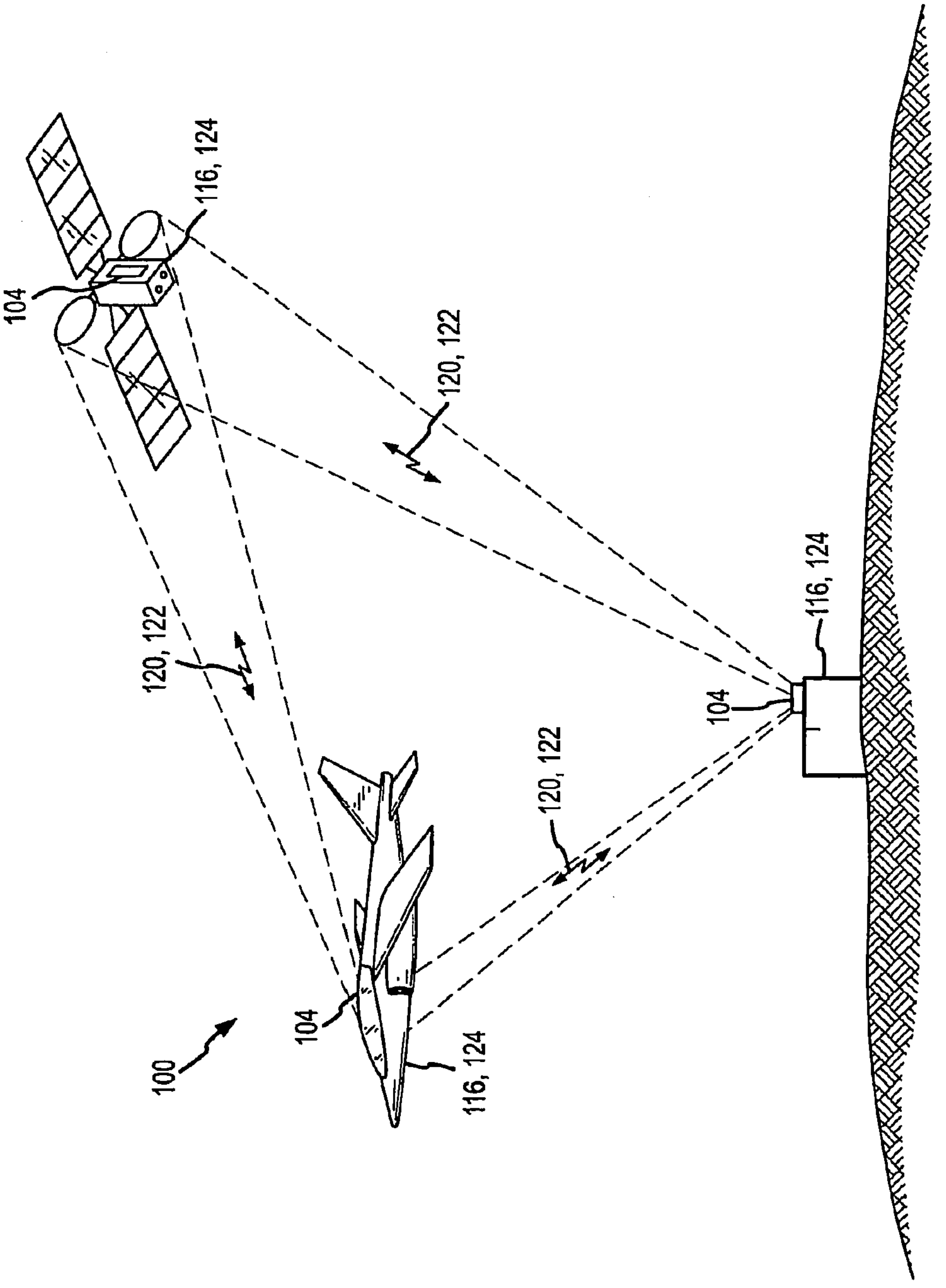
FIG. 1B depicts a mechanically steered antenna in an exemplary operating environment.

With reference now to FIG. 1B, an exemplary operating environment will be described in accordance with embodiments of the present invention. In the example of FIG. 1B, an antenna assembly 104 having a mechanically steered lens assembly 112 is shown. As noted above, the antenna assembly 104 comprises a transceiver 108 and a mechanically steered lens assembly 112. The mechanically steered lens assembly 112 is used to produce a steered beam 120, 122. Additionally, the mechanically steered lens assembly 112 may be used to direct a beam 122 received from an endpoint 116 toward the transceiver 108. The beam 120 formed by the antenna assembly 104 is typically used in connection with communications between a structure 124 with which the antenna assembly 104 is associated and various endpoints 116. It should be appreciated that one antenna assembly 104 may comprise an endpoint 116 for another antenna assembly 104, as shown with respect to the aircraft, satellite, and/or ground station depicted in the figure. Although depicted as being deployed on a building, satellite, or in an aircraft, it can be appreciated that an antenna assembly 104 capable of providing a steered beam 120, 122 in accordance with embodiments of the present invention can be deployed in connection with any device or location where beam steering is desired. Furthermore, while an endpoint 116 may typically include a space borne satellite or the like, an endpoint 116 can comprise any ground, sea, air, or space based device or platform. Also, while the example system shown in FIG. 1B is described as being used for communications, such as for sending or receiving data, telemetry or control instructions, it can be appreciated that another exemplary use for an antenna assembly 104 may include radar systems for identifying and tracking vehicles.

Figure 2:
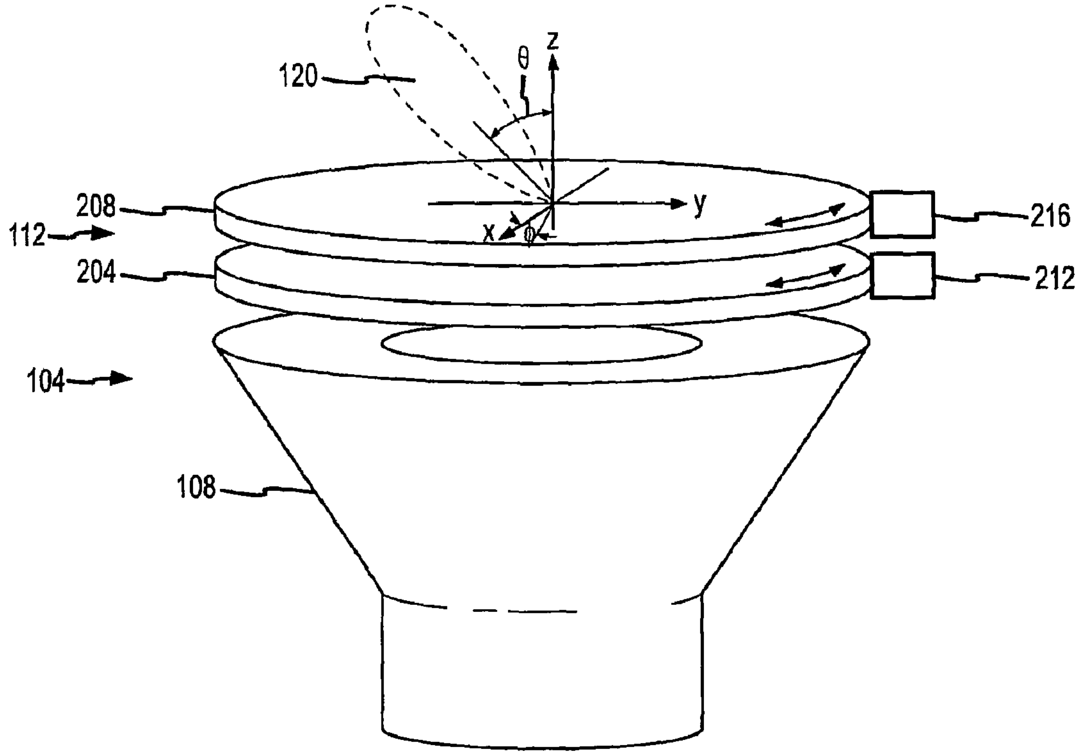
FIG. 2 is a perspective view of an exemplary antenna comprising a mechanically steered lens assembly in accordance with embodiments of the present invention.

Referring now to FIG. 2, an exemplary antenna assembly 104 will be described in accordance with embodiments of the present invention. As noted above, the antenna assembly 104 comprises a transceiver 108 and a mechanically steered lens assembly 112. The transceiver 108 is operable to send and/or receive beams 120, 122 typically for communication purposes. Examples of a suitable transceiver 108 include, but are not limited to, a horn antenna, an electronically steered phased array, a patch antenna, a planar micro-strip array, or the like. The mechanically steered lens assembly 112 may comprise a first lens element 204 and a second lens element 208. The first lens element 204 is rotated about the z-axis by a first rotation element 212 and the second lens element 208 is rotated about the z-axis by a second rotation element 216. The first and second rotation elements 212 and 216 may be servomotors or the like in communication with a control panel. The first and second rotation elements 212 and 216 may be connected to the first and second lens elements 204 and 208 directly, or via an intermediate, transmission, which may comprise a shaft, gear, belt, pulley, or the like. The actuation of the first rotation element 212 causes the first lens element 204 to rotate relative to both the transceiver 108 and the second lens element 208. Likewise, the actuation of the second rotation element 216 causes the second lens element 208 to rotate relative to the transceiver 108 and the first lens element 204. By a controlled rotation of the first 204 and/or second 208 lens, a beam 120, 122 may be steered in both azimuth and elevation. In particular, the rotation of the lens elements 204 and 208 may cause a beam 120, 122 to be steered by an angle of $\phi$ in the x-y plane and may further cause the beam 120, 122 to be tilted by an angle of $\theta$ about the z-axis (i.e., the focal axis of the lens elements 204 and/or 208). Thus, a selective steering of the beam 120, 122 in three dimensions can be achieved by the rotation of the lens elements 204 and/or 208 about a rotational axis that is substantially normal to the plane of the lens elements 204 and/or 208.

The beam 120 may be generated by the transceiver 108 and begin by traveling substantially parallel to the z-axis. The generated beam 120 then encounters the first lens element 204 and undergoes a change of direction after it passes through the first lens element 204. The beam 120 then strikes the second lens element 208 and is transmitted in another direction presumably to an endpoint 116.

Likewise, a beam 122 emitted from a distant endpoint 116 strikes the second lens element 208 where the direction of travel is changed after it passes through the second lens element 208. The first lens element 204 then receives the beam 122 where the direction of travel is changed again such that the new direction of travel of the beam 122 is substantially parallel to the z-axis, allowing for or facilitating reception of the beam 122 by the transceiver 108.

Figure 3:
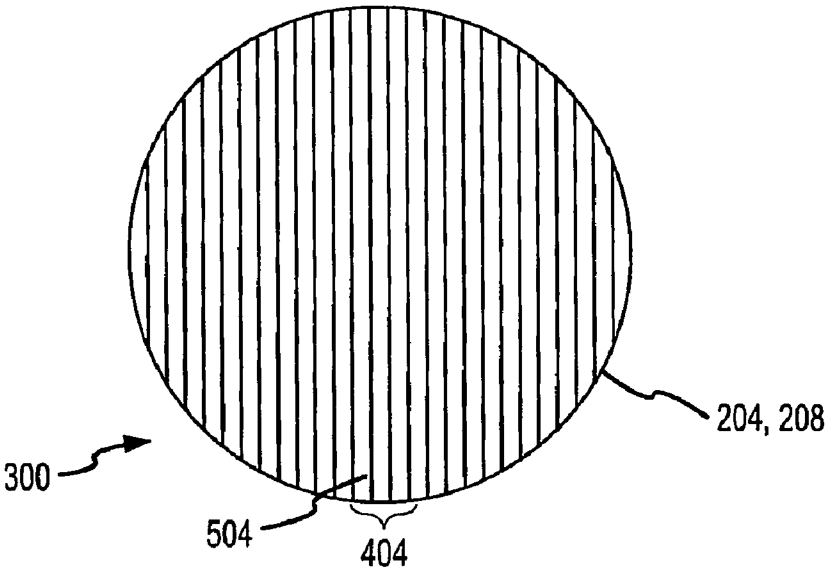
FIG. 3 is a plan view of a stepped dielectric lens element in accordance with embodiments of the present invention.
Figure 4:
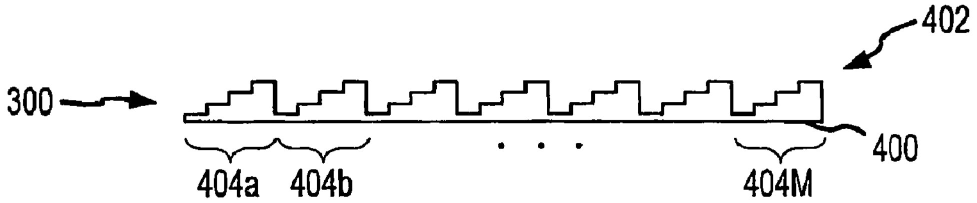
FIG. 4 is a cross-sectional view of a stepped dielectric lens element in accordance with embodiments of the present invention.
Figure 5:
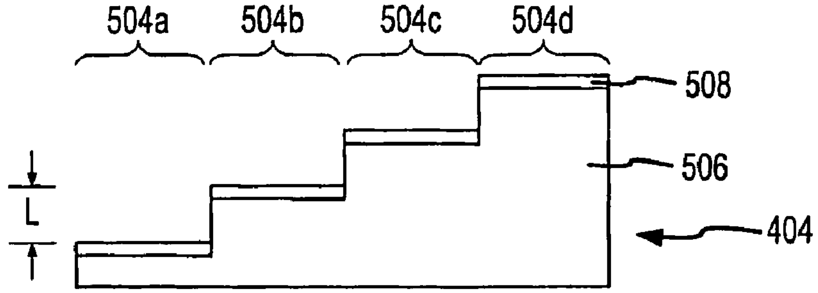
FIG. 5 is a cross-sectional view of a section of a stepped dielectric lens element in accordance with embodiments of the present invention.

With reference now to FIGS. 3-5, an exemplary lens element 204, 208 comprising a stepped dielectric lens element 300 will be described in accordance with at least some embodiments of the present invention. The stepped dielectric lens element 300 is constructed such that it features a planar first surface 400 and a stepped second surface 402 that is divided into a number of sections 404*a-m* where m is typically greater than or equal to one. Subsequently, each section is further divided into a number of portions 504*a-d*. Although the lens element 300 depicted in FIG. 5 shows four portions 504 per section 404. It can be appreciated by one of skill in the art that a greater or lesser number of portions can be included within a section 404, with the minimum number of portions 504 per section 404 being two.

The lens element 300 comprises a stepped dielectric 506. As illustrated, an anti-reflection coating 508 may be provided on a surface of the dielectric 506. The stepped dielectric 506 may be any type of suitable dielectric material. For example, the dielectric 506 may comprise porcelain (ceramic), mica, glass, plastic, oxides of various metals, and any other material that is a relatively poor conductor of electricity but a relatively efficient supporter of electrostatic fields. Because the dielectric material has a different dielectric constant than air, the beam 120, 122 is generally forced to slow down for a longer period of time when traveling though the thicker portion than through a thinner portion.

The anti-reflection coating 508 operates to ensure that a portion of the beam 120, 122 incident upon one portion 504 of the lens element 300 does not reflect and interfere with another portion of the same beam 120, 122. The anti-reflection coating 508 may be made of dielectric materials similar to 506 or the like, but 508 will be chosen to such that the relative dielectric constant or index of reflection is roughly the square root of that chosen for 506.

The stepped dielectric lens element 300 is essentially an optical equivalent of a dielectric wedge. A dielectric wedge is a continuous wedge of dielectric material that operates to change the phase of an incident beam by a certain amount. However, the stepped dielectric lens element 300 has a lower profile due to the repetition of sections 404, rather than the continuous increase in thickness as with a dielectric wedge. Of course, for a beam 120, 122, a stepped dielectric lens element 300 will begin to introduce errors into the phase shift of a beam as the frequency changes from the design center frequency for the steps. This reduces the bandwidth of operation relative to the continuous dielectric wedge, although the anti-reflection coating 508 limits the bandwidth of the continuous dielectric wedge. However, as can be appreciated by one of skill in the art, a stepped dielectric lens element 300 substantially mimics a dielectric wedge over practical frequency bandwidths.

In accordance with embodiments of the present invention, the stepped dielectric lens element 300 is intended to substantially replicate the continuously increasing thickness of a dielectric wedge. However, due to the repetition of sections 404, the thickness of the stepped dielectric lens element 300 does not increase continuously. Rather, the thicknesses of portions 504 within a first section 404 increase incrementally until a different section 404 begins. The portions 504 within the next section 404 generally have the same thickness of the portions 504 within the first section 404. Therefore, a stepped dielectric lens element 300 in accordance with embodiments of the present invention can provide a maximum steering angle comparable to that of a dielectric wedge, but with a maximum dielectric thickness that is much less than the maximum dielectric thickness of a dielectric wedge formed from the same material as the stepped dielectric lens element 300.

The thickness of each portion 504 within a section 404 of a stepped dielectric lens element 300 can be determined using a modulo 2π division of the lens element 300. The division of a section 404 into portions 504 using a modulo 2π division format provides equal step functions within 360° and provides repeatability of each section 404. In other words, with a modulo 2π division, each section 404 of the lens element 300 behaves in substantially the same way. Therefore, the spacing of each portion 504 within each section 404 can be substantially the same and the lens element 300 can be constructed much more easily than a lens element not exhibiting a modulo 2π division of sections 404. As can be appreciated based on the present disclosure, the sections 404 may comprise a dielectric wedge, with the repetition of wedges at each section 404. A lens element 300 constructed in this way still provides a maximum scan angle comparable to a full dielectric wedge with the improvement of a smaller profile than the full dielectric wedge.

A modulo 2π spacing of portions 504 in a section 404 having four portions 504 results in a phase shift of 0-90-180-270 degrees respectively between each of the portions 504 in the section 404. The difference between the thicknesses of the portions 504 can be determined for a frequency of interest and a selected relative phase shift between portions employing the following equation:

$$L = \frac{\alpha}{360^\circ} \cdot \frac{\lambda}{\sqrt{\varepsilon} - 1}$$

where L is equal to the difference in thickness between adjacent portions 504, α is the relative phase shift in degrees between adjacent portions 504, ϵ is the dielectric constant of the material relative to air or the medium in which the lens element 300 is surrounded by, and λ is the wavelength of a beam 120, 122 to be steered by the lens element 300. Accordingly, for a lens element 300 formed using a dielectric material having a dielectric constant of 4.0 relative to air that is to steer a beam 120, 122 having a wavelength of 1.0 cm, the difference in thickness between adjacent portions 504 is 0.25 cm. The progression in portion 504 thicknesses of the first section 404 may then be repeated in the next section 404, thereby substantially matching the phase shift of the previous section 404.

Likewise, a modulo 2π spacing for a section 404 comprising six portions 504 results in a phase shift of 0-60-120-180-240-300 degrees respectively between the six portions 504 in such a section 404. In an extreme example, a modulo 2π spacing for a section 404 comprising two portions 504 results in a phase shift of 0-180 degrees respectively between the two portions 504 in such a section 404. In general, with modulo 2π spacing it is desirable to repeat phase shifts every 360 degrees. Of course, it can be appreciated by one of skill in the art after consideration of the present disclosure that modulo 2π spacing is not necessarily required to provide a low profile dielectric lens element 300 that mimics a dielectric wedge.

The phase shift between adjacent portions 504 in a modulo 2π division is related to the maximum scan angle of a lens element by the following equation:

$$\alpha = 360^\circ \frac{d}{\lambda} \sin\theta$$

where θ is the maximum scan angle of the beam 120, 122 by the lens element, where λ is the wavelength of the beam 120, 122 incident on the lens element, where d is the center-to-center distance between portions 504 or the longitudinal length of a single portion 504, and where α is the phase shift in degrees between portions 504.

If the number of portions 504 per section 404 is a fixed parameter, then the spacing d of portions 504 can be determined for a desired maximum scan angle using the phase shift equation shown above.

As previously noted, four portions 504 per section 404 under a modulo 2π spacing provides a step function of 0-90-180-270 degrees respectively between the four portions 504. Thus, the phase shift or α between adjacent portions is 90 degrees. Assuming that a maximum scan angle (e.g., the angle the beam 120, 122 is steered relative to the z-axis) of approximately 30 degrees is desired for a lens element 300, then the distance between each adjacent portion 504 should be about λ/2 when there are four portions 504 per section 404. A larger maximum scan angle may be achieved with the same number of portions 504 by decreasing the distance between each portion 504 (i.e., by using a progression that is different from a modulo 2π spacing of portions 504). Up to 90 degrees of scan angle can be realized if the distance between each portion 504 is about λ/4. Alternatively, a smaller scan angle may be achieved by increasing the distance between portions 504.

Increasing the number of portions 504 within a section 404 generally decreases the scan angle of the beam 120, 122. For example, if the number of portions 504 per section 404 is six, then a step function of 0-60-120-180-240-300 degrees is achieved between portions 504. With six portions 504 per section 404 being spaced apart by λ/2, a single lens element 300 can achieve a scan angle of approximately 19.5 degrees. Alternatively, the use of fewer portions 504 per section 404 can result in a larger scan angle. However, as can be appreciated by one of skill in the art, if two portions 504 are used per section 404, then a null may be formed in the beam 120, 122. Of course, it is envisioned that there may be applications where such a configuration of portions 504 is desirable.

There is a limit to the construction and eventual spacing of portions 504 within a section 404. Specifically, if the portions 504 are spaced too far apart, center-to-center, then a grating lobe or null will be introduced to the beam 120, 122. The maximum spacing between portions 504 that can be achieved without resulting in any substantial grating lobes can be derived from the following equation:

$$d_{MAX} = \frac{N-1}{N}\left(\frac{1}{1+\sin\theta}\right)\lambda$$

where $d_{MAX}$ is the maximum distance between portions 504, where N is the number of portions 504 per dielectric lens element 300, where θ is the maximum scan angle, and where λ is the wavelength of the beam 120, 122.

An advantage offered by using a stepped dielectric lens element 300 is that an antenna can be constructed that is polarization independent. In other words, the stepped dielectric lens element 300 is operable to steer a beam 120, 122 having a single direction of polarization, dual linear polarization, and/or dual circular polarization.

Figure 6:
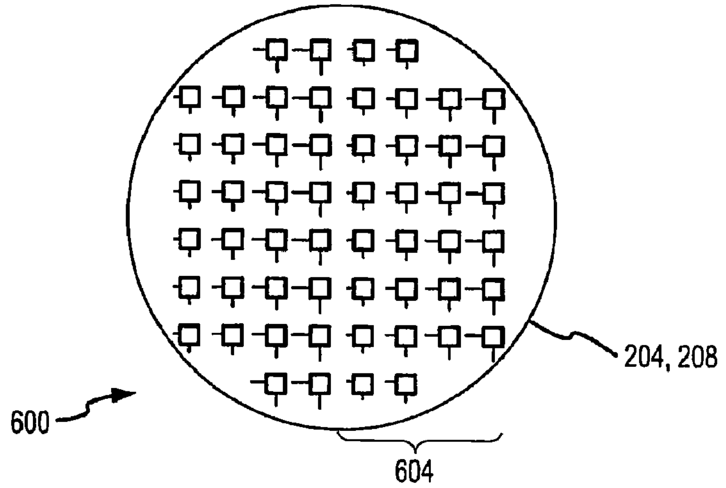
FIG. 6 is a plan view of a lens element in accordance with embodiments of the present invention.
Figure 7:
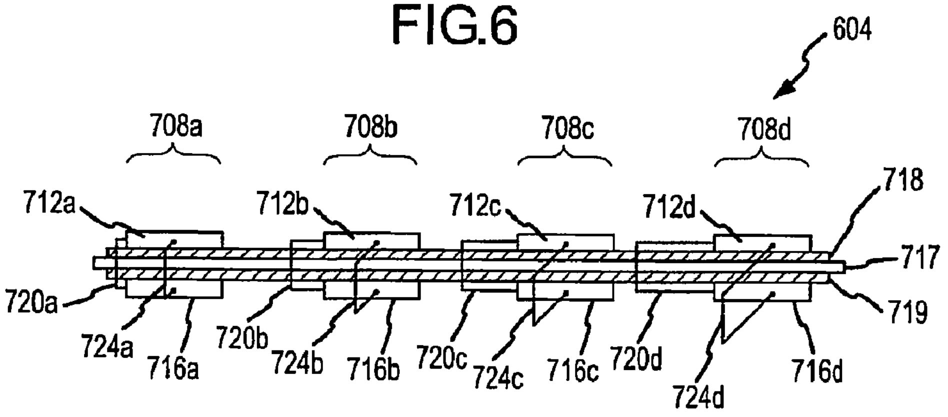
FIG. 7 is cross-sectional view of a section of a lens element in accordance with embodiments of the present invention.

Referring now to FIGS. 6 and 7 a lens element 204, 208 comprising a lens element 600 comprising back-to-back radiating elements will be described in accordance with at least some embodiments of the present invention. As with the stepped dielectric lens element 300, the lens element 600 is divided into sections 604, which are further divided into portions 708. As can be appreciated by one of skill in the art, up to N portions 708 may exist per section 604, where N is typically greater than or equal to two.

In the depicted embodiment, there are four portions 708*a-d* in a given section 604. Each portion 708 comprises a first radiating element 712 and a corresponding second radiating element 716. With four portions 708*a-d* there are four first radiating elements 712*a-d* and four corresponding second radiating elements 716*a-d* per section 604. The first radiating elements 712 are separated from the second radiating elements 716 by a ground plane 717, a first insulating layer 718, and a second insulating layer 719. The ground plane 717 comprises a first side in communication with the first insulating layer 718 and a second side in communication with the second insulating layer 719. The first insulating layer 718 separates the first set of radiating elements 712 from the ground plane 717. Likewise, the second insulating layer 719 separates the second set of radiating elements 716 from the ground plane 717.

Each pair of radiating elements 712 and 716 is connected by transmission lines 720 and/or 724. With four portions 708*a-d* there are four corresponding transmission lines 720*a-d* and 724*a-d*. The first transmission line 720 is connected to a first side of the radiating element 712 and 716, while the second transmission line 724 is connected to a second side adjacent to the first side of the radiating element 712 and 716. The first transmission line 720 is operable to transmit a beam 120, 122 having a first direction of polarization from the first radiating element 712 to the second radiating element 716. Likewise, the second transmission line 724 is operable to transmit a signal from a beam 120, 122 having a second direction of polarization from the first radiating element 712 to the second radiating element 716. As can be appreciated, the first and second transmission lines 720 and 724 are also operable to transmit a beam from the second radiating element 716 to the first radiating element 712. The use of two transmission lines 720 and 724 provides for a lens element 600 that is polarization independent. In other words, the lens element 600 is operable to receive and transmit beams 120 having dual linear polarization. Therefore, in the event that a polarization dependent antenna 600 is desired, only one of the two transmission lines 720 and 724 may be used to connect the radiating elements 712 and 716.

The radiating elements 712 and/or 716 may be constructed of any suitable material including, but not being limited to, copper, aluminum, and the like. Essentially, the radiating elements 712 and 716 are operable to receive a beam 120, whether from a distant source or a proximal source, and transmit the energy of the beam through at least one of the transmission lines 720 and 724 to the opposed complimentary radiating element 712 or 716. The beam 120, 122 is differentially delayed as a result of being transmitted through the transmission lines 720 and/or 724. After being differentially delayed, the beam 120, 122 is transmitted in a new direction by the opposite radiating element, based on the differential phase shift imparted to the beam 120, 122 by the portions 708. Within a section 604, each transmission line or set of transmission lines 720, 724 differs in length from the transmission line or set of transmission lines 720, 274 associated with an adjacent portion 708, so that adjacent portions of the beam 120, 122 are differentially delayed. When an antenna assembly 104 is operating in a transmit mode, each first radiating element 712 generally operates as a transmitting element and each second radiating element 716 operates as a receiving element. When the antenna assembly 104 is operating in a receive mode, each first radiating element 712 generally operates as a receiving element and each second radiating element 716 operates as a radiating element. The radiating elements 712 and/or 716 may include, without limitation, patch elements, spiral radiating elements, dipoles, Vivaldi antennas, slots, and any other type of radiating element capable of operating in a transmit and/or receive mode.

The ground plane 717 may comprise any material that acts as an electrical insulator. Essentially, the electrical energy passed between the radiating elements 712 and 716 should only be transmitted via the transmission lines 720 and/or 724. The ground plane 717 along with the insulating layers 718 and 719 essentially act as an electrical barrier between the radiating elements 712 and 716.

The lens element 600 is operable to steer a beam 120, 122 by delaying the transmission of the beam 120, 122 at one portion, for example, 708*d* relative to another portion, for example, 708*c*. The delay of each portion of the beam 120, 122 is achieved by utilizing transmission lines 720 and/or 724 of different length at each adjacent portion 708. The first set of transmission lines 720*a* and 724*a* are of a first length, typically a relatively small length. The second set of transmission lines 720*b* and 724*b* are of a second length that is somewhat longer than the length of the first set of transmission lines 720*a* and 724*a*. In the same way, the third set of transmission lines 720*c* and 724*c* are of a third length that is relatively longer than the length of the second set of transmission lines 720*b* and 724*b*. Also, the fourth set of transmission lines 720*d* and 724*d* are of a fourth length that is typically comparatively longer than the length of the third set of transmission lines 720*c* and 724*c*. Although certain examples presented herein include sections 604 having four portions 708, a greater or lesser number of portions 708 may be present per section 604. For example, in the illustrated embodiment, a portion of the beam 120, 122 incident upon a radiating element 712*a* or 716*a* in the first portion 708*a* will take a shorter amount of time to travel to the opposed radiating element 712*a* or 716*a* than a portion of the beam 120, 122 incident upon a radiating element 712*b* or 716*b* in the second portion 708*b* will take to travel to the opposed radiating element 712*b* or 716*b*. In other words, a portion of the beam 120, 122 incident upon a radiating element 712*d* or 716*d* will be delayed relative to a portion of the beam 120, 122 incident upon a radiating element 712*c* or 716*c* before it is retransmitted. This delay results in a phase shift of the portions of the beam 120, which in turn results in the steering of the beam.

Similar to the thicknesses of portions 504 in the stepped dielectric lens element 300, the length of each transmission line 720, 724 is typically determined by the modulo 2π spacing of radiating elements 712, 716. The difference in length between transmission lines 720, 724 across each section 604 is intended to electrically emulate a dielectric wedge. Thus, the length of each transmission line 720, 724 is generally determined by the modulo 2π spacing of portions 708 within a section 604. The equation described above used to determine the differential thicknesses between dielectric portions 504 may also be applied to determine the differential effective lengths between transmission lines 720, 724 with a few minor modifications. One modification is the relative dielectric constant ∈ is not the dielectric constant of the transmission line 720, 724 relative to the medium (i.e., air) surrounding the lens element 600. Rather, the dielectric constant ∈ is the absolute dielectric constant of the transmission line 720, 724. In other words, the relative dielectric constant ∈ is the difference between the dielectric constant of the transmission line 720, 724 and free space. Accordingly, portions of the beam 120, 122 may be differentially delayed not only by varying the length of transmission lines 720, 724, but by using different materials for transmission lines 720, 724 in a section 604.

Figure 8:
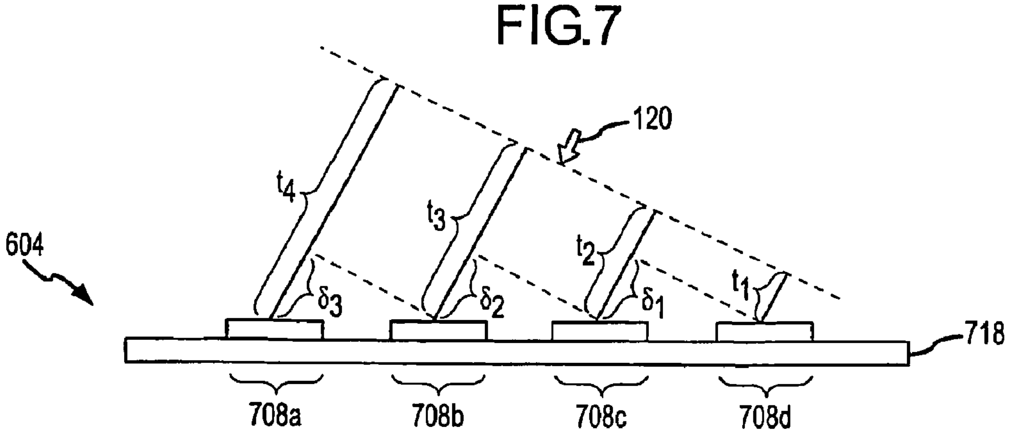
FIG. 8 is a cross-sectional view of a section of a lens element in accordance with embodiments of the present invention in relation to a beam front.

Referring now to FIG. 8, the delay imposed on portions of a beam 120, 122 by various portions 708 of a lens element will be described in accordance with embodiments of the present invention. Although the depicted embodiment describes delays with respect to the lens element 600, it can be appreciated that the following discussion equally applies to the stepped dielectric lens element 300 or any other lens element 204, 208 described herein. The depicted section 604 is divided into four portions 708*a-d*. A beam 120, 122 is shown as impacting the lens element 600 at an angle. This angle of incidence causes the beam 120, 122 to impact the fourth portion 708*d* (i.e., the fourth radiating element 712*d* or 716*d*) at a first time $\tau_1$. Likewise the angle of incidence causes the beam 120, 122 to impact the third portion 708*c* at a second time $\tau_2$. The difference between the first impact time $\tau_1$ and the second impact time $\tau_2$ is $\delta_1$. Continuing in this fashion, the beam 120, 122 impacts the second portion 708*b* at a third time $\tau_3$ and the first portion 708*a* at a fourth time $\tau_4$. The difference between the second impact time $\tau_2$ and the third impact time $\tau_3$ is $\delta_2$ and the difference between the third impact time $\tau_3$ and fourth impact time $\tau_4$ is $\delta_3$.

As can be appreciated by one of skill in the art, the beam 120, 122 may be incident upon the lens element 600 such that the first through fourth times $\tau_1$ to $\tau_4$ are substantially equal. After the beam 120, 122 has been passed through the transmission lines 720 and 724, the orientation of the beam may be substantially equal to the scan angle θ associated with the lens element 600.

Assuming that the scanning angle θ is equal to the angle of incidence, the beam 120, 122 will be redirected such that it is transmitted away from the lens element 600 in a direction that is substantially orthogonal to the ground plane 717. To effect this redirection/reorientation of the beam 120, the portion of the beam 120, 122 received at the fourth portion 708*d* should be delayed by the difference between $\tau_1$ and $\tau_4$ plus the delay of the first portion 708*a*. In other words, the amount of delay at the fourth portion 708*d* relative to the amount of delay relative to the first portion 708*a* should be substantially equal to the sum of $\delta_1$, $\delta_2$, and $\delta_3$ if the beam 120, 122 is to be redirected substantially orthogonal to the ground plane 717. Furthermore, given the same scanning angle, the portion of the beam 120, 122 received at the third portion 708*c* should be delayed by the difference between $\tau_2$ and $\tau_4$ or by the sum of $\delta_2$ and $\delta_3$ plus the delay of the first portion 708*a*. Additionally, the portion of the beam 120, 122 received at the second portion 708*b* should be delayed by the difference between $\tau_3$ and $\tau_4$ or by $\delta_3$ plus the delay of the first portion 708*a*. If the above-described delays are imposed on the beam 120, 122 at the corresponding portions 708*b-d*, then the lens element 600 will transmit the beam 120, 122 at an angle that is substantially orthogonal to the ground plane 717. It should be noted that the scanning angle achieved by the lens element 300 or 600 does not necessarily need to equal the angle of incidence of the beam 120, 122 upon the lens element 300 or 600. In fact, an incident beam 120, 122 is typically not redirected at an angle that is orthogonal to the ground plane 717, especially when two lens elements are used cooperatively to steer a beam 120, 122. The differential delaying of discrete portions of the beam 120, 122 causes each portion of the beam 120, 122 to undergo a phase shift, which, as noted above, results in a steering of the beam. The amount of differential delay, and therefore phase shift, can be altered if different beam steering specifications are desired. For example, a lens element with more portions per section, will typically impart a smaller phase shift between portions of the beam 120 than a lens element having fewer portions per section. The smaller phase shift between portions will result in a smaller scan angle of the beam 120, 122. Properties of the lens element 600 are generally governed by the same equations as the stepped dielectric lens element 300. Therefore, the adjustment of various parameters of the lens element 600 to achieve different phase shifts and scan angles generally parallels the adjustments that are possible in accordance with the stepped dielectric lens element 300.

In the event that two lens elements are used cooperatively to steer a beam 120, the first of the two lens elements may have a certain number of portions per section, whereas the second of the two lens elements may have a different number of portion per section than the first lens element. Many configurations of the lens element(s) are possible to achieve beam steering. In a preferred embodiment, two lens elements are used collectively to steer a beam 120, 122 and each lens element is configured to have a maximum scan angle of approximately 30 degrees. Due to the sine-weighted function associated with beam steering, in accordance with embodiments of the present invention, the lens assembly 112 comprising two lens elements 204, 208 can achieve a maximum scan angle of 90 degrees relative to the z-axis.

Figure 9:
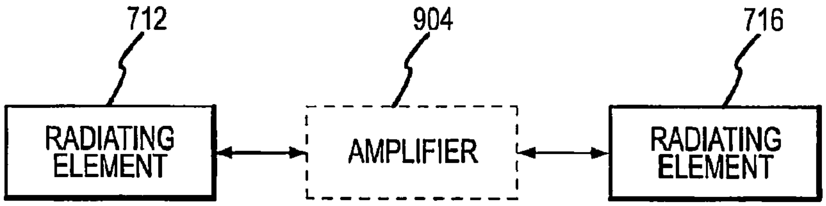
FIG. 9 is a block diagram depicting components of back-to-back radiating elements in accordance with embodiments of the present invention.

Referring now to FIG. 9 an alternative embodiment of the lens element 600 will be described in accordance with embodiments of the present invention. As noted above, the transmission lines 720 and/or 724 function to transmit a portion of the beam 120, 122 from a first passive radiating element 712 to a second passive radiating element 716. Typically, the transmission lines 720 and/or 724 are simple conductors meant to transmit the beam as efficiently as possible. However, an optional amplifier 904 or any other active or passive circuit element can be placed between the first 712 and second 716 passive radiating elements. The amplifier 904 can help to increase signal strength or filter out unwanted frequency bandwidths.

Figure 10:
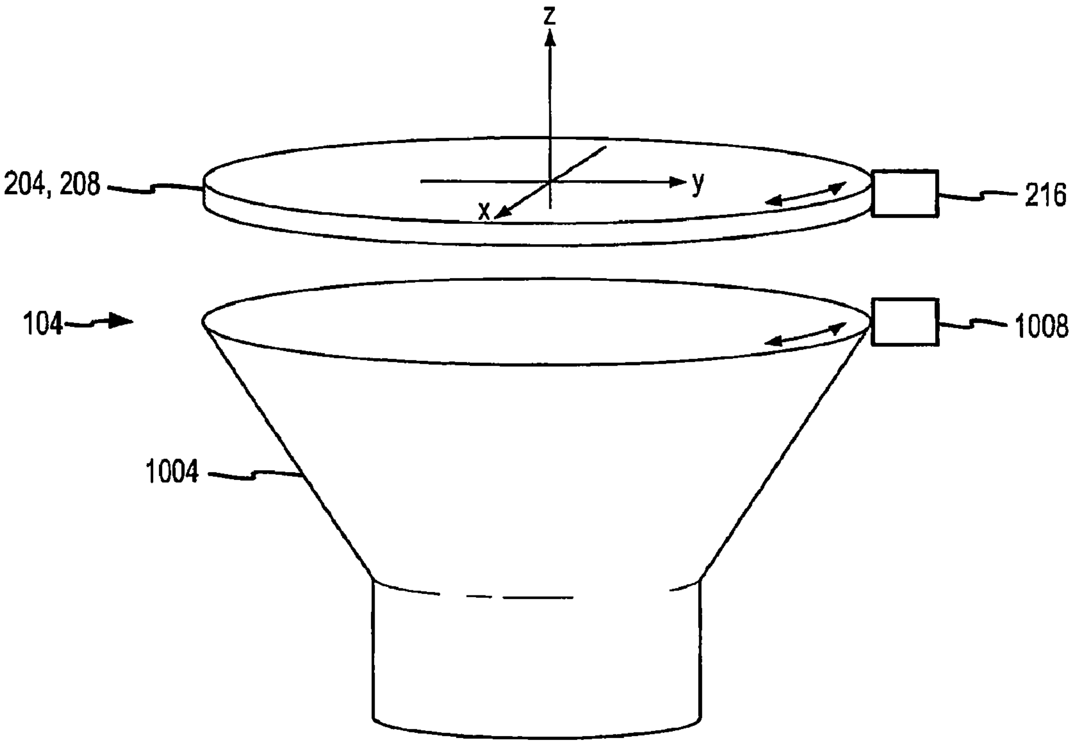
FIG. 10 is a perspective view of an exemplary mechanically steered antenna assembly in accordance with embodiments of the present invention.

With reference to FIG. 10, an alternative antenna assembly 104 will be described in accordance with embodiments of the present invention. An antenna assembly 104 may be constructed with only a first lens element 204 and a pre-steered transceiver 1004. The pre-steered transceiver 1004 may be much like a typical transceiver 108 except that any beam 120 generated by the transceiver 1004 is transmitted at an angle relative to the z-axis. The first lens element 204 can be used to further steer the beam 120, 122 in practically any direction. Likewise, the first lens element 204 can steer a beam received from a distant source such that it can be received by the pre-steered transceiver 1004. The pre-steered transceiver 1004 may be enabled with its own rotation member 1008 that operates to rotate the transceiver 1004 about the z-axis.

Figure 11A:
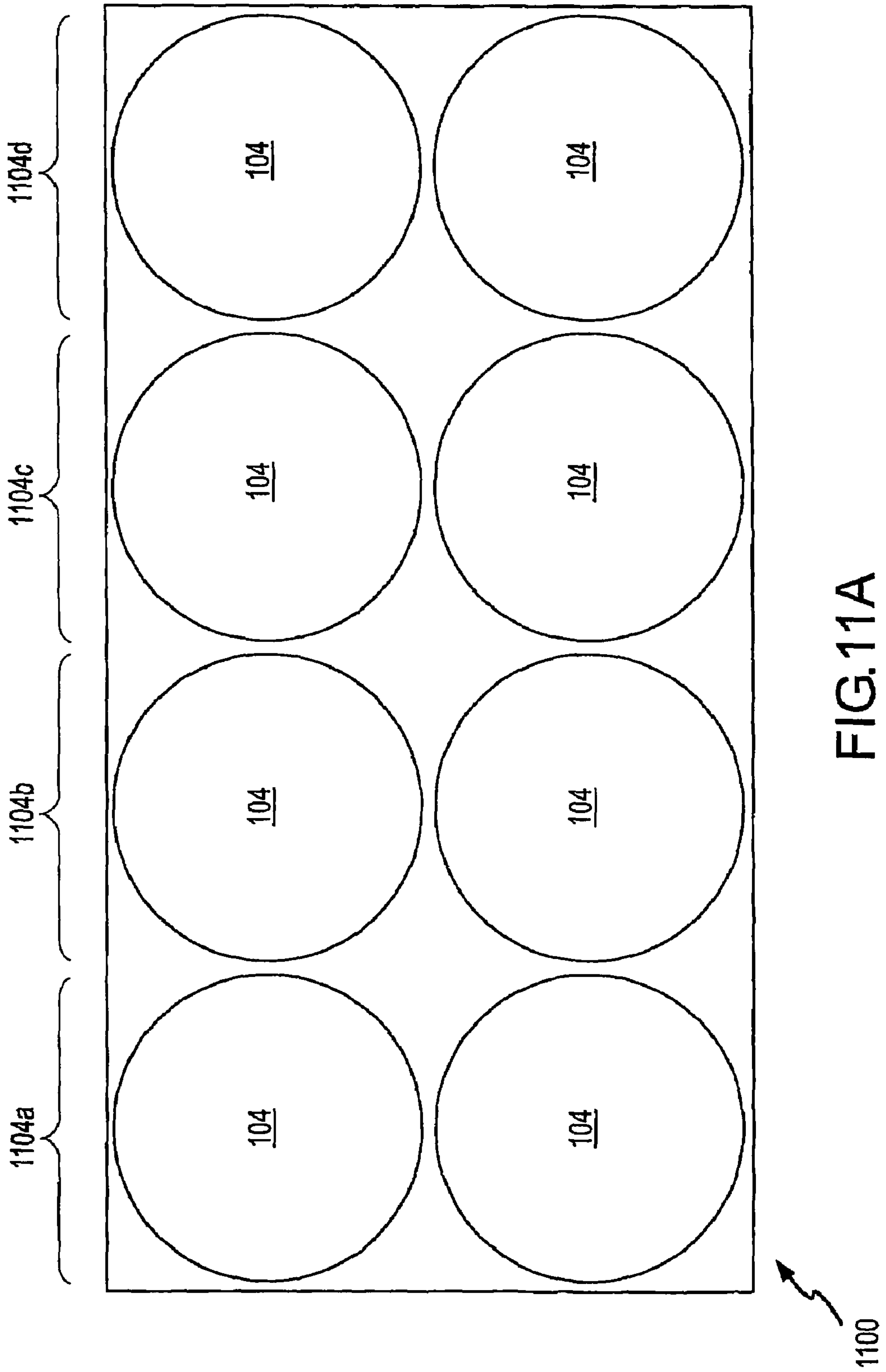
FIG. 11A is a top view of a phased array antenna in combination with an array of mechanically steered lens assemblies in accordance with embodiments of the present invention.
Figure 11B:
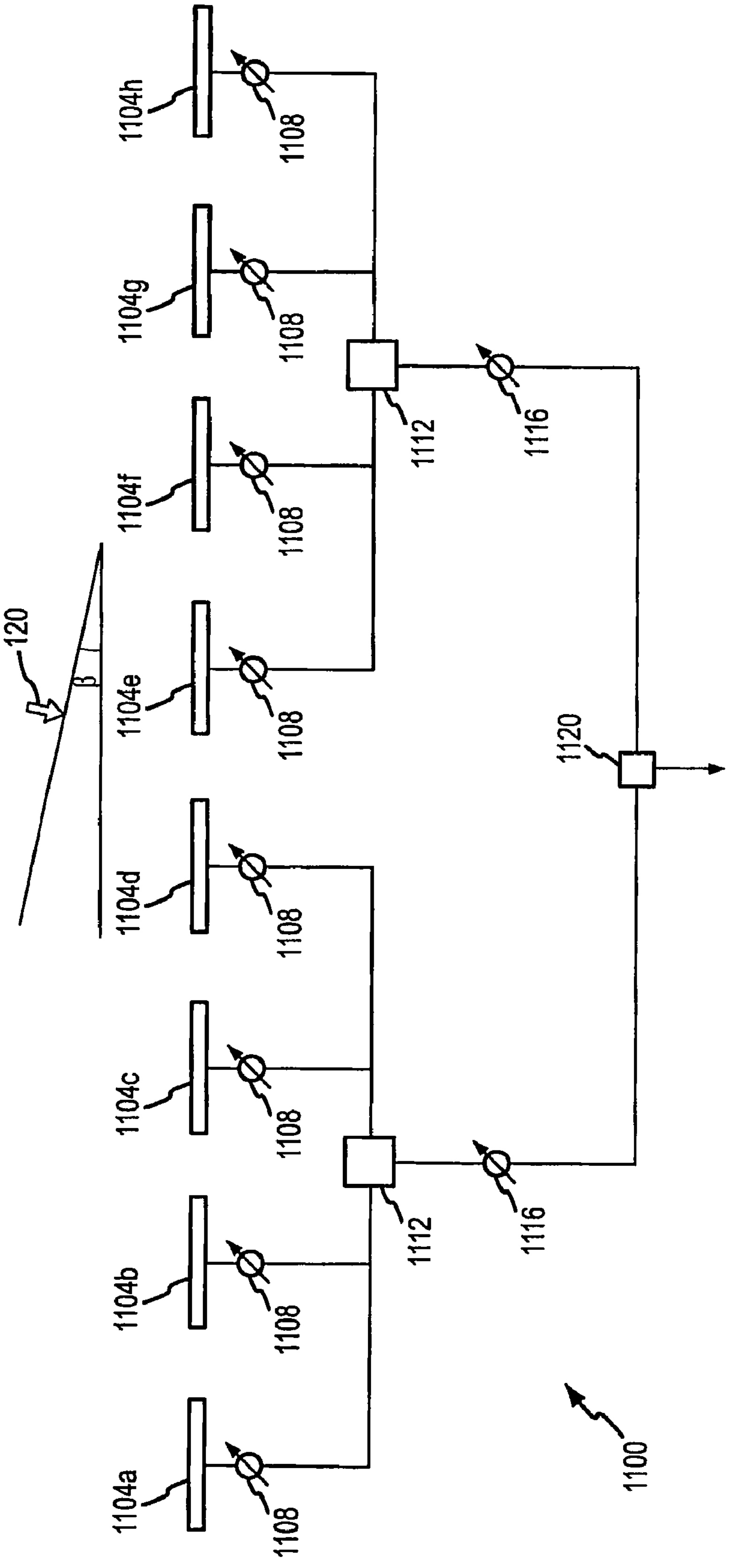
FIG. 11B is a block diagram depicting an antenna in combination with an array of mechanically steered lens assemblies in accordance with embodiments of the present invention.

Referring now to FIGS. 11A and 11B, an array antenna 1100 comprising multiple antenna assemblies 1104 will be described in accordance with at least some embodiments of the present invention. An array antenna 1100 is generally constructed to create a relative large steerable antenna. Rather than designing a single relatively large assembly having discrete portions, a large array can be broken up into smaller pieces that can function collectively to act like one large antenna assembly. The array antenna 1100 comprises a number of portions 1104*a-d* much like the portions of a lens element. The portions 1104*a-h* generally comprise individual antenna assemblies 104. Each assembly is operable to steer a beam 120, 122 as described above. The array of antenna assemblies 1100 further comprises a number of phase shifters 1108 and 116 and a number of power combiners 1112 and 1120.

A beam 120, 122 that strikes the array antenna 1100 at an angle of incidence approximately equal to the angle β does not strike each of the assemblies 104 at the same time. Rather, similar to the situation noted above with reference to FIG. 8, the beam 120, 122 strikes each portion 1104*a-h* at a different time. Because of this, each portion of the beam 120, 122 received at each portion 1104 needs to be delayed according to the following function such that the energy from the beam can be combined:

$$A=D\cdot\sin\beta$$

where A is the phase shift required by the phase shifters 1108 and 1116, where D is the center-to-center distance between portions 1104 that require a phase shift, and where β is the angle of incidence of the beam 120, 122 on the array antenna 1100. The distance D between portions 1104 for the first level of portions (i.e., the distance between 1104*a* and 1104*b*) is basically the distance between the centers of each antenna assembly 104. Whereas the distance D between portions 1104 at the second level of portions is the distance between the centers of each set of antenna assemblies (i.e., the distance between the center of the collective portions 1104*a-d* and the collective portions 1104*e-h*).

A set of antenna assemblies 1104*a-d* are connected by a power combiner 1112. After the phase of each portion of the beam 120, 122 received at each antenna assembly 104 is adjusted, the signal from each portion 1104 can be combined at the power combiner 1112 resulting in a summed signal of the portions (i.e., portions 1104*a-d* or 1104*e-h*). The summed signal from each of those portions may be subjected to another phase shift by the phase shifters 1116 according to the above-noted equation. Thereafter, the phase-shifted signals are summed at the power combiner 1120. Although, the depicted array antenna 1100 comprises eight portions 1104, of which four are combined at the first level, and the combination of each four are combined at the second level. It can be appreciated that there may be more or fewer portions 1104 per set. Furthermore, there may be more or fewer levels of power combining. For example, all eight of the portions 1104 may have their respective phase changed, if necessary, such that all eight portions 1104 are in phase at the first level. Thereafter, all eight portions 1104 may be combined at a single power combiner 1112. Alternatively, only two portions 1104 may be combined at each level. The number of phase changes, and subsequently the number of power combiners, may vary depending upon design considerations and the like.

By implementing an array antenna 1100, redundancy is provided. For example if one assembly 104 fails or malfunctions, and the other assemblies 104 continue to operate, the array antenna 1100 will still be able to send/receive signals to/from an endpoint 116. Furthermore, if one of the assemblies 104 requires maintenance, then that assembly 104 can be attended to without substantially affecting the operation of the entire array of antennas 110.

Figure 12A:
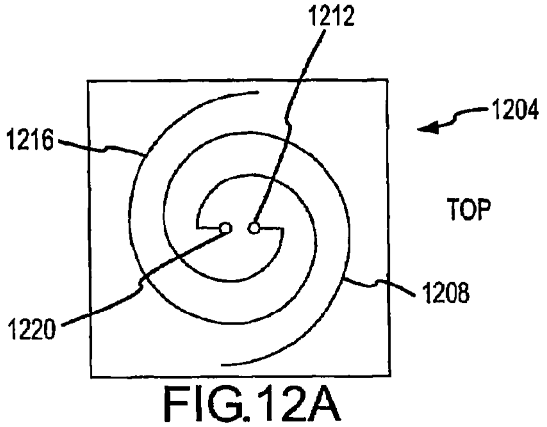
FIG. 12A is a top spiral back-to-back radiating element in accordance with embodiments of the present invention.
Figure 12B:
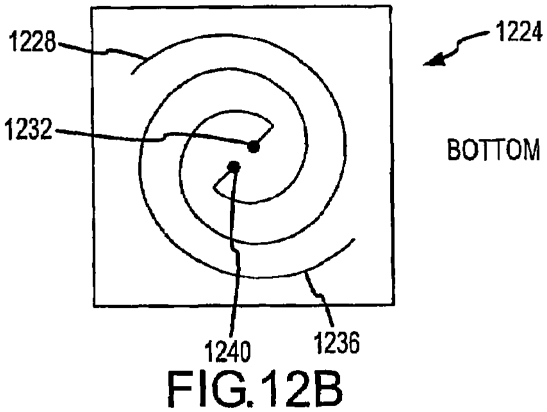
FIG. 12B is a bottom spiral back-to-back radiating element in accordance with embodiments of the present invention.
Figure 12C:
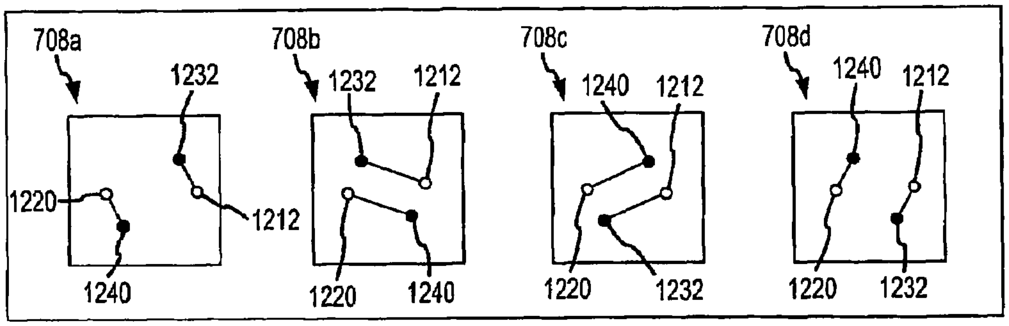
FIG. 12C is a block diagram depicting a section of a lens having rotated spiral back-to-back radiating elements in accordance with embodiments of the present invention.

With reference now to FIGS. 12A-C an alternative configuration of radiating elements 712 and 716 will be described in accordance with at least some embodiments of the present invention. As noted above the radiating elements 712 and 716 may be connected by transmission lines 720 and 724 of varying length. Such radiating elements are operable to change the phase of a dual linearly polarized beam 120, 122 incident upon the lens element 300. Alternatively, the lens element 300 may be equipped with spiral radiating elements 1204 and

1224 that can change the phase and direction of travel of a circularly polarized beam 120, 122.

The spiral radiating elements 1204 and 1224 come in a set and are separated by a ground plane 717, first insulating layer 718, and a second insulating layer 719 as noted above. However, the spiral radiating elements 1204 and 1224 are not connected by transmission lines of various lengths, but instead are differentially rotated relative to one another in different portions 708*a-d* of the lens element 600. The top spiral radiating element 1204 comprises a first line 1208 with a first terminus 1212 and a second line 1216 with a second terminus 1220. The top spiral 1204 is depicted as having a clockwise rotation emanating from the terminus.

The bottom spiral 1224 (as viewed from the top of the lens element 300) has a counterclockwise rotation emanating from its respective terminus. Like the top spiral 1204, the bottom spiral 1224 comprises a first line 1228 with a first terminus 1232 and a second line 1236 with a second terminus 1240. The first terminus of the top spiral 1212 is connected to the first terminus of the bottom spiral 1232. Similarly, the second terminus of the top spiral 1220 is connected to the second terminus of the bottom spiral 1240.

As depicted in FIG. 12B, the bottom spiral 1224 is rotated relative to the top spiral 1204 at each portion 708*a-d*. As previously noted, there may be a greater or lesser number of portions 708 per section 604. However, for easy repeatability of phase shift between sections 604, the amount of relative rotation between each pair of spirals should be 360 degrees divided by the number of portions 708 (i.e., N) in the section 604. For example, with four portions 708*a-d*, the relative rotation of any one set of spirals compared to the relative rotation of an adjacent set of spirals should be about 90 degrees. Stated in another way, consider a first set of spirals both oriented with a first amount of relative rotation. A second set of spirals that is adjacent to the first set of spirals should have the first amount of relative rotation plus about an additional 90 degrees of relative rotation.

In the depicted embodiment, a beam 120, 122 incident upon the top (or bottom) spiral will undergo a delay in transmission in one portion relative to another portion in the same section in the event that the beam 120, 122 has a left-handed circular polarization. Alternatively, in the event that the top spiral 1204 had a counterclockwise rotation emanating from the terminus and the bottom spiral 1224 had a clockwise rotation (as viewed from the top) emanating from the terminus, then a right-handed circularly polarized beam 120, 122 would experience a phase shift. The phase shifting is accomplished because as the spirals are rotated relative to one another, a beam 120, 122 incident upon each portion 708 must travel a different distance before it is transmitted by that portion.

Figure 13:
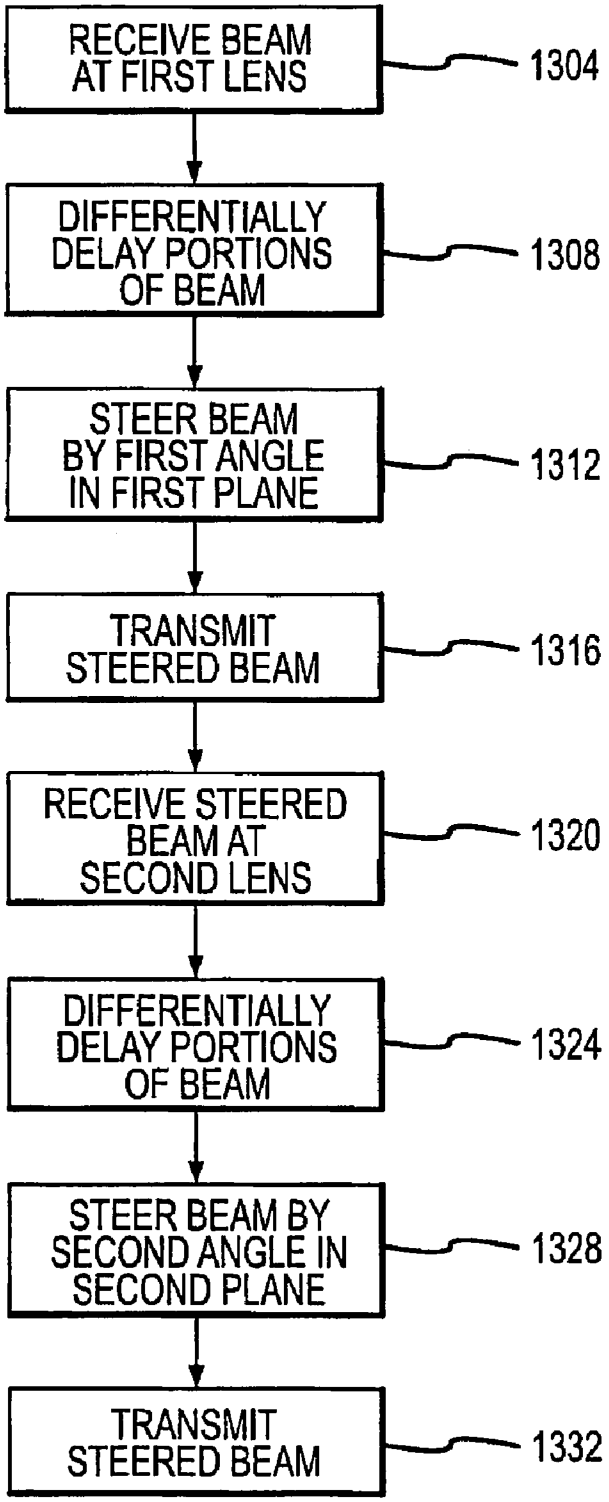
FIG. 13 is a block diagram depicting a method of steering a beam in accordance with embodiments of the present invention.

Referring now to FIG. 13 a method of steering a beam 120, 122 will be described in accordance with at least some embodiments of the present invention. Initially, a beam 120, 122 is received at a first lens element 204, 208 (step 1304). The beam 122 may be received from a distant source like an endpoint 116. Alternatively, the beam 120 may be received from a proximal source like the transceiver 108. After the beam 120, 122 has been received at the first lens element 204, 208, portions of the beam 120, 122 are differentially delayed (step 1308). As one portion of the beam 120, 122 is delayed by an amount different from another portion of the beam 120, 122, a phase shift between the two portions is realized. Each portion within a section of the beam 120, 122 is differentially delayed relative to all other portions within the same section. The differential delay of portions in one section is preferably matched by the differential delay of portions in another section of the lens. The phase shift between portions further results in a steering of the beam 120, 122 by a first scan angle in a first plane (step 1312). Once the beam 120, 122 has been steered by the first lens element, the beam 120, 122 is transmitted by the first lens element (step 1316).

In the event that two lens elements form the mechanically steered lens assembly 112, the beam 120, 122 transmitted by the first lens element 204, 208 is received at a second lens element 204, 208 (step 1320). Subsequently, portions of the received beam are differentially delayed by the second lens element (step 1324). The second lens element may differentially delay portions of the beam by amounts similar to the first lens element. Alternatively, the portions of the beam may be differentially delayed by a different amount at the second lens element. Due to the differential delay imparted to each portion in the section, the second lens element steers the beam 120, 122 by a second scan angle in a second plane (step 1328). As can be appreciated, the second plane may be substantially parallel to the first plane, such that the beam 120, 122 is steered twice in the same plane. Alternatively, the first and second planes may not be substantially parallel to one another. As a result, the beam 120, 122 may be steered in two different planes. After the beam 120, 122 has been steered by the second lens element, the beam 120, 122 is transmitted (step 1332). The beam 122 may be transmitted toward a transceiver 108 or the beam 120 may be transmitted to an endpoint 116.

Figure 14:
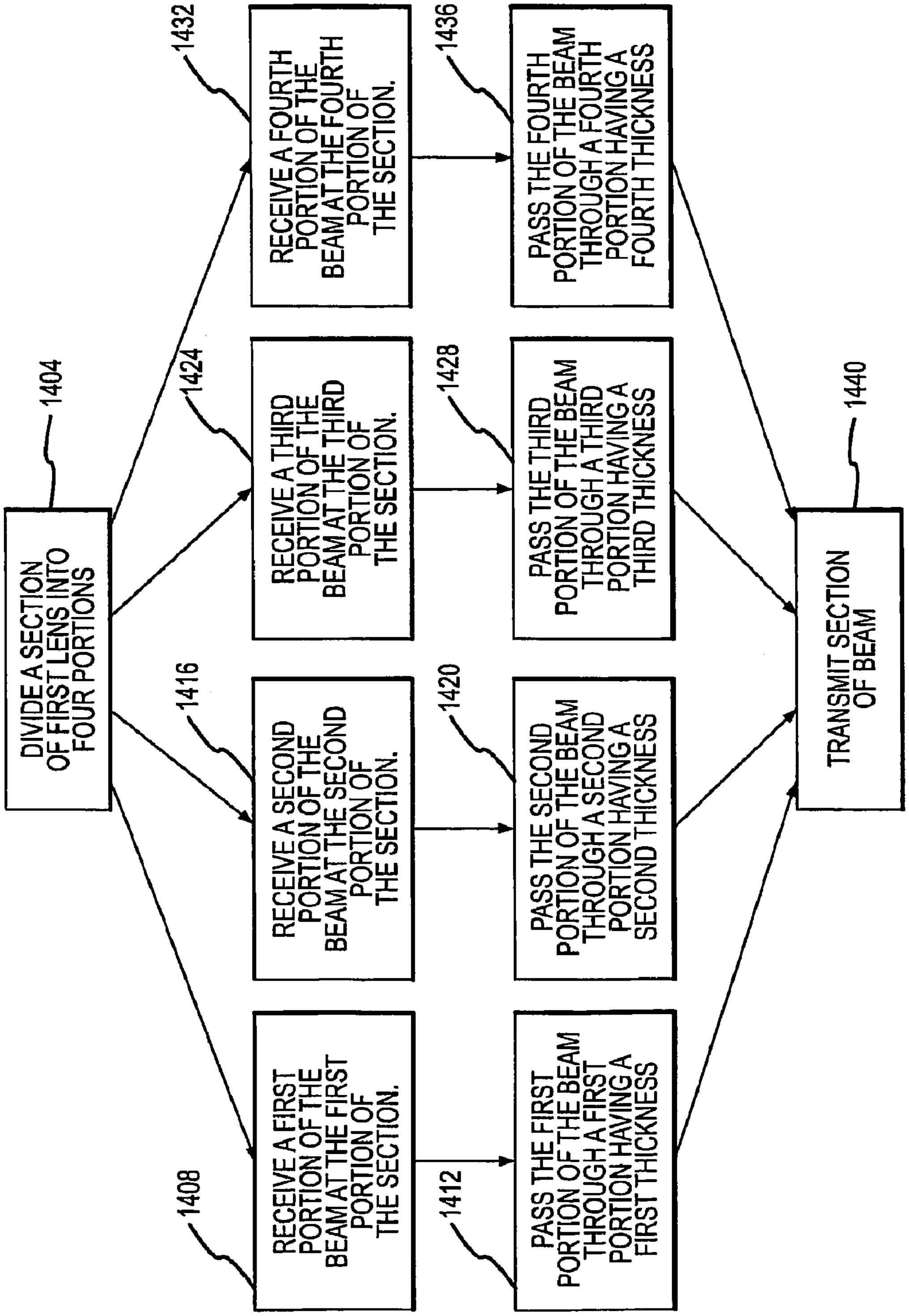
FIG. 14 is a block diagram depicting a method of steering portions of a section of a beam in accordance with embodiments of the present invention.

Referring now to FIG. 14 a method of changing the phase of a section of the beam 120, 122 with a dielectric lens element so as to induce a scan angle on a beam 120, 122 will be described in accordance with at least some embodiments of the present invention. Although the following describes steering using a lens element section comprising four portions, it should be understood that more or fewer portions per section might exist. Thus, the following description is not intended to limit the scope of the present invention.

Initially, a section of the first lens element is divided into four portions (step 1404). Each portion is typically linearly disposed across the lens element. A first portion of the beam 120, 122 is received at the first portion of the section (step 1408). The beam 120, 122 may be oriented such that the wavefront of the beam is substantially parallel to the rotational plane of the lens element. Alternatively, the wavefront of the beam may be offset from the rotational plane by an angle equal to the scanning angle of the lens element. Further in the alternative, the wavefront of the beam may be striking the lens element at an angle greater than or less than the scanning angle of the lens element.

Thereafter, the first portion of the beam 120, 122 is passed through the first discrete portion of dielectric material having a first thickness (step 1412). Due to the thickness of the first portion of the dielectric material, the beam 120, 122 is slowed down relative to a beam traveling though free space.

A second portion of the beam is received at the second portion of the section (step 1416). The second portion of the beam 120, 122 may be received at the second portion of the lens element at substantially the same time as the first portion of the beam 120, 122 is received at the first portion of the lens element. In other words, the wavefront of the beam is substantially lined up with the angle of incline between the first and second portions. Of course, the wavefront of the beam 120, 122 does not have to line up with the phase altering portions of the lens element. For example, the times at which the beam 120, 122 is received at the first and second portions may be offset by a certain amount of time.

The second portion of the beam 120, 122 is then passed through the second discrete portion of dielectric material having a second thickness (step 1420). The thickness of the second portion of dielectric material is different from the first portion and therefore, the second portion of the beam 120, 122 undergoes a different delay than the first portion of the beam 120, 122, such that the phase of the first and second portions differs. The different delays between portions causes the orientation of the beam 120, 122 between the first and second portions to change relative to the orientation of the beam 120, 122 before it was passed through the first and second portions of the lens element.

A third portion of the beam 120, 122 is received at the third portion of the section (step 1424). As noted above, the wavefront of the beam 120, 122 may strike the lens element such that the beam 120, 122 is received at the first, second, and third portions at substantially the same time. However, the beam 120, 122 may be received at different times at all three portions. Moreover, the beam 120, 122 may be received at two of the three portions at one time and may be received at a third of the three portions at another different time. However, this is not a common occurrence because typically there is a constant angle of incline from one portion to the next such that the portions of the lens element act similar to a dielectric wedge.

After the third portion of the beam 120, 122 is received at the lens element, the third portion of the beam 120, 122 is passed through the third discrete portion of dielectric material having a third thickness (step 1428). Again, the thickness of the third portion of dielectric material differs from both the first and second portions. The difference in thickness, results in the phase of the third portion of the beam 120, 122 being different than the first and second portions of the beam 120, 122.

Finally, a fourth portion of the beam 120, 122 is received at the fourth portion of the section (step 1432). Similar to above, the fourth portion of the beam 120, 122 may be received at substantially the same time as the first, second, and third portions. Although, depending upon the angle of incidence and the relative rotation of the lens element, each portion does not necessarily need to be received at the same time.

The fourth portion of the beam 120, 122 is passed through the fourth portion of dielectric material having a fourth thickness (step 1436). The fourth thickness is different from the first, second, and third thickness, and, as a result, the phase of the fourth portion of the beam 120, 122 is changed with respect to the first, second, and third portions of the beam 120, 122.

After each portion of the beam 120, 122 has been passed through its respective portion of the section, the section of the beam 120, 122 is transmitted (step 1440). The beam 120, 122 may be transmitted at an angle substantially orthogonal to the plane of the lens element (i.e., parallel to the z-axis of the lens element) or the beam 120, 122 may be transmitted in a different direction from its initial direction of travel. The orientation of the beam 120, 122 is changed due to the relative changes in phase between adjacent portions of the beam 120, 122. The beam 120, 122 is typically steered relative to the z-axis by an amount equal to the scanning angle of the lens element. As described above, the number of portions within a section and the spacing of those sections may affect the scanning angle. In the event that the beam 120, 122 is received at an angle substantially parallel to the z-axis of the lens element, then the beam 120, 122 will typically be transmitted off of the z-axis at an angle about equal to the scanning angle. Alternatively, the beam 120, 122 may be received at an angle that is equal to the scanning angle, then the beam 120, 122 may be transmitted at an angle that is substantially parallel to the z-axis. Furthermore, if the beam 120, 122 is received at any other angle, the amount of reorientation of the beam 120, 122 relative to the z-axis will be substantially equal to the scanning angle.

Figure 15:
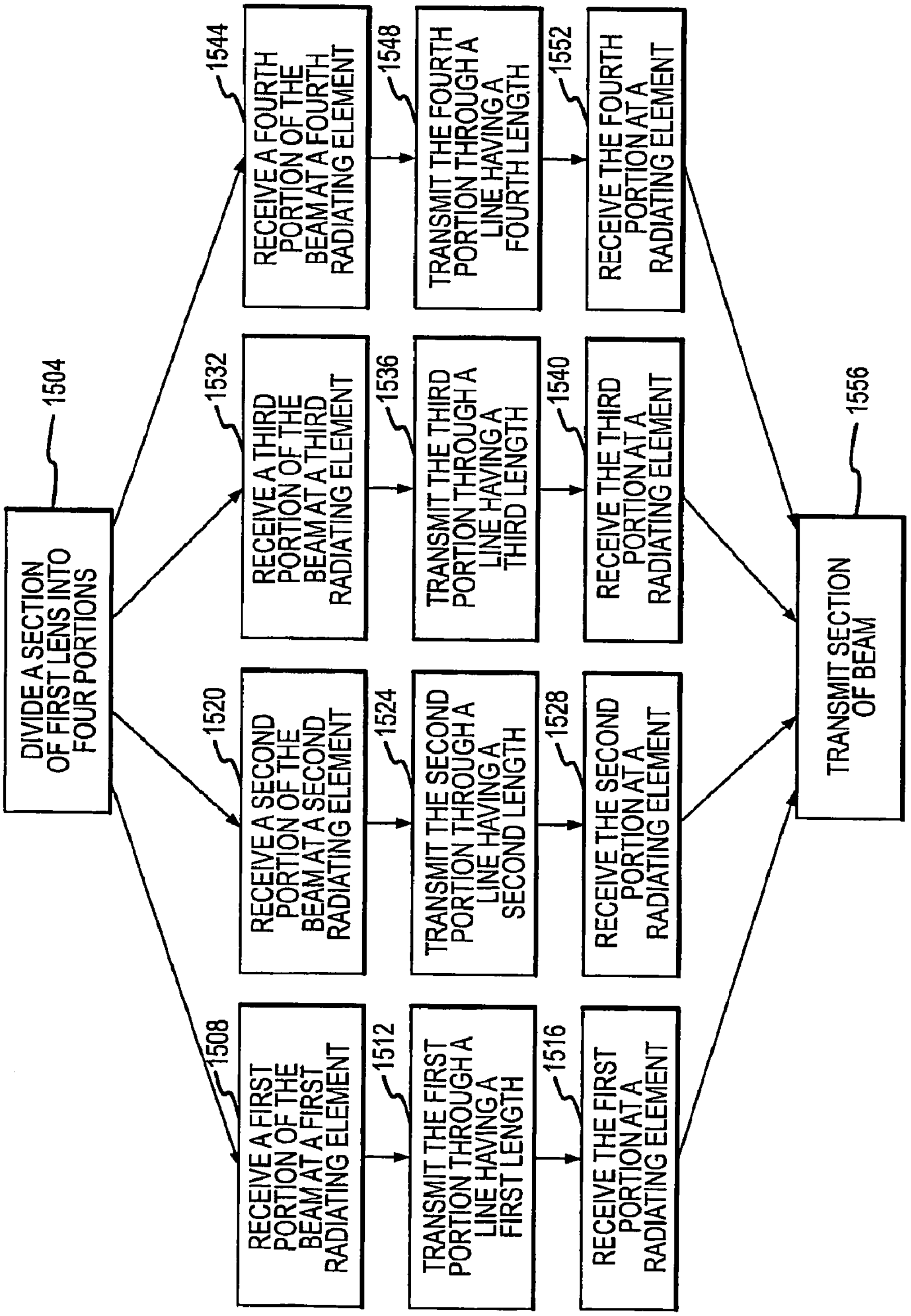
FIG. 15 is a block diagram depicting a method of steering portions of a section of a beam in accordance with other embodiments of the present invention.

Referring now to FIG. 15, a method of changing the phase of portions of the beam 120, 122 so as to induce a scan angle on a section of the beam 120, 122 will be described in accordance with at least some embodiments of the present invention. Initially a section of a lens element is divided into four portions (step 1504). Thereafter, a first portion of the beam 120, 122 is received at a first radiating element (step 1508). A single first radiating element may substantially define the first portion of the lens element. Alternatively, a linear collection of first radiating elements may define the first portion.

The received portion of the beam 120, 122 is then transmitted through a line having a first length (step 1512). As can be appreciated, depending upon the polarization of the beam 120, the received portion of the beam 120, 122 may be transmitted through two transmission lines from the first radiating element to the corresponding radiating element. In the event that a number of first radiating elements define the first portion, the lengths of each transmission line for each first element is substantially the same. After the first portion of the beam is transmitted through the transmission line(s), the transmitted portion of the beam 120, 122 is received at a radiating element corresponding to the first radiating element (step 1516).

A second portion of the beam 120, 122 is received at a second radiating element (step 1520). Again, the second radiating element by itself may define the second portion or a collection of second radiating elements may define the second portion. The second portion of the beam 120, 122 is then transmitted through one or more transmission lines having a second length (step 1524). The length of the first line(s) may actually be different than the length of the second line(s). Alternatively, the effective length of the first line(s) may differ from the effective length of the second line(s) due to a differential relative rotation between the first radiating element and its corresponding radiating element and the second radiating element and its corresponding radiating element. As noted above, multiple transmission lines may be used to transmit beams 120 of various polarizations. The transmission lines connecting each of the second radiating elements are typically equal to one another such that the second portion treats a beam 120, 122 uniformly throughout the portion. The transmitted beam 120, 122 is later received at the radiating element corresponding to the second radiating element (step 1528).

A third portion of the beam 120, 122 is received at a third radiating element or collection of radiating elements, which substantially define the third portion of the lens element (step 1532). The received third portion of the beam 120, 122 is transmitted through a third transmission line having a third length or a collection of third transmission lines, each having a third length (step 1536). Again, the physical length of the third line(s) may differ from the first and second line(s). On the other hand, the third radiating element(s) may have a different amount of rotation relative to its corresponding radiating element as compared to the first and second radiating elements and their corresponding radiating elements. In this case, the actual length of the transmission line may not actually differ between the first, second, and third portions, but rather the effective length of the transmission line may differ. The transmitted beam 120, 122 is then received at the radiating element corresponding to the third radiating element (step 1540).

A fourth portion of the beam 120, 122 is received at a fourth radiating element or set of radiating elements defining the fourth portion of the lens element (step 1544). The fourth radiating element(s) basically constitutes the fourth portion of the section. The received portion of the beam 120, 122 is transmitted through a fourth transmission line having a fourth length or a number of fourth transmission lines, each having the fourth length (step 1548). As noted above, the actual lengths of the transmission lines may differ or the effective lengths of each transmission line may differ. The transmitted portion of the beam 120, 122 is then received at a radiating element(s) corresponding to the fourth radiating element(s) (step 1552).

Due to the differing lengths of each transmission line, the phase of each portion of the beam 120, 122 is changed. The phase change of each portion of the beam 120, 122 results in a steering of the beam 120, 122 by the lens element. In step 1556, after a phase shift has been imparted to each portion of the beam 120, the beam is transmitted at an angle offset from the angle of incidence about the z-axis approximately equal to the scanning angle.

Although parts of the description reference four discrete portions of the antenna per section, it can be appreciated by one of skill in the art after reading this disclosure that a section of a lens element in accordance with embodiments of the present invention comprise a greater or lesser number of discrete portions depending upon the desired application.

Furthermore, although embodiments of the present invention have been described that redirect a beam 120, 122 into a different direction of travel by implementing a uniform division of a section into portions, embodiments are envisioned where each section of a lens element redirects a section of a beam into a different direction. In other words, adjacent portions of a beam 120, 122 may be differentially delayed by a first amount in a first section, while adjacent portions of a beam 120, 122 may be differentially delayed by a second amount in a second section. The differential delay of portions within sections by amounts varying across sections can focus a beam 120, 122 to a particular point. Thus, in accordance with at least some embodiments of the present invention, the lens element may be used to redirect a beam 120, 122 and/or focus it towards a focal point.

Figure 16:
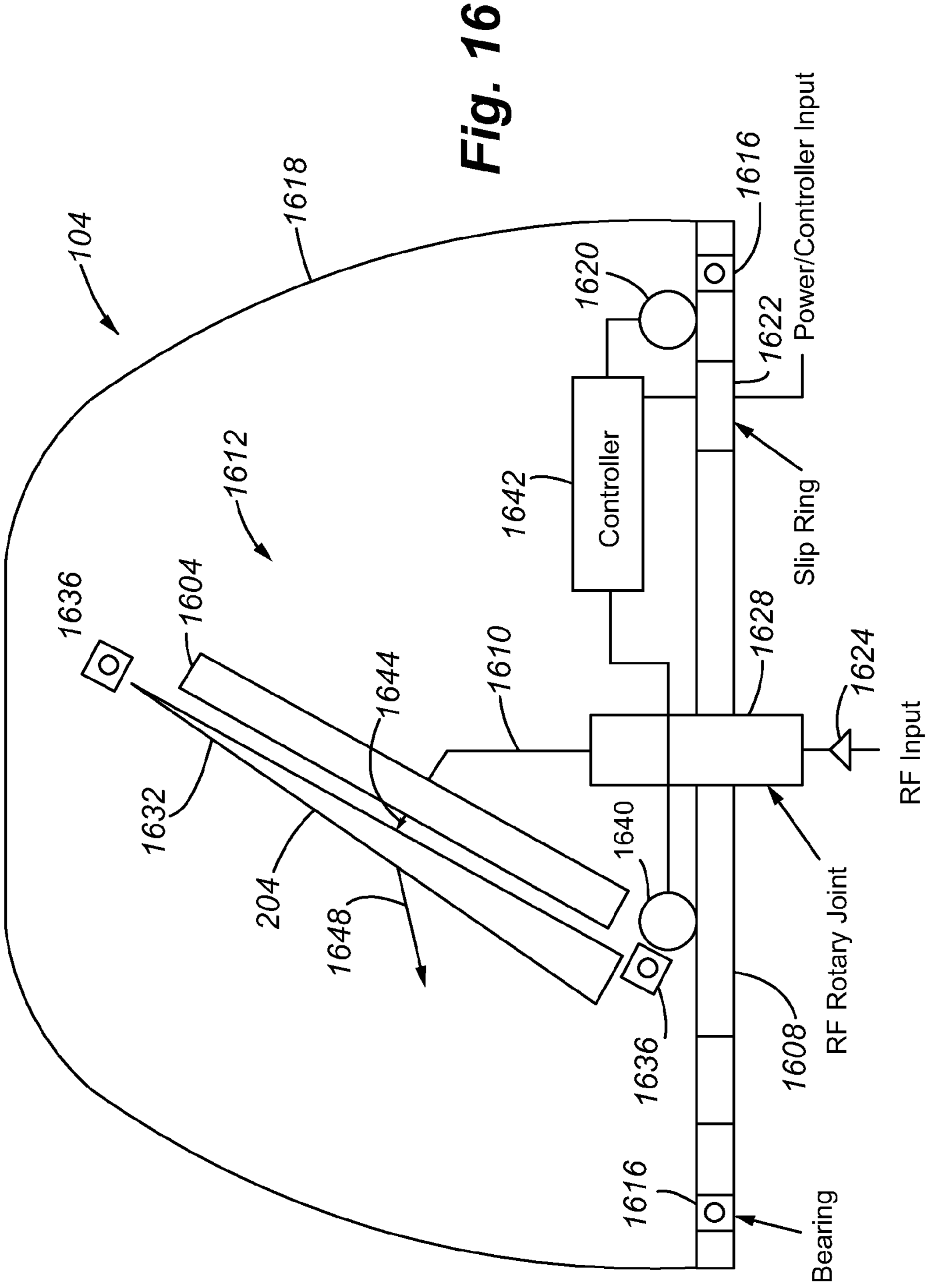
FIG. 16 depicts components of an exemplary antenna incorporating a mechanically steered antenna assembly in accordance with other embodiments of the present invention.

With reference now to FIG. 16, an antenna assembly 104 incorporating a mechanically steered antenna assembly 1612 in accordance with further embodiments of the disclosed invention is depicted. In general, the antenna assembly 104 includes a feed aperture 1604 that is tilted in elevation. In addition, the feed aperture 1604 is mounted to a rotating carrier plate or turntable 1608. The axis of rotation 1610 of the rotating carrier plate 1608 defines the axis with respect to which the feed aperture 1604 is tilted. Moreover, as can be appreciated by one of skill in the art, although the rotating carrier plate 1608 is illustrated in a horizontal orientation, embodiments of the disclosed invention can operate with the rotating carrier plate 1608 and the overall antenna assembly 104 in any orientation. In accordance with embodiments of the present invention, the feed aperture 1604 may comprise a planar antenna.

The rotating carrier plate 1608 can be mounted to a vehicle or support structure via bearings 1616, within a radome 1618. The radome 1618 may be fixed with respect to the vehicle or support structure to which the antenna assembly 104 is interconnected (as shown in FIG. 16), or the radome 1618 can rotate with respect to the carrier plate 1608. Rotation of the rotating carrier plate 1608 can be controlled via a motor 1620. Signals transmitted and/or received by the tilted feed aperture 1604 can be passed between an amplifier 1624 and the tilted feed aperture 1604 via a rotary joint 1628. As can be appreciated by one of skill in the art, the amplifier 1624 may comprise or be connected to transmit and/or receive electronics. Moreover, the amplifier 1624 and/or transmit and/or receiver electronics can be located inside the radome 1618 or can be externally connected. Also, as can be appreciated by one of skill in the art, although a transmit system is depicted, the mechanically steered antenna assembly 1612 is also compatible with receive only systems, as well as half and full-duplex systems. In particular, the mechanically steered antenna assembly 1612 can be adapted for use in other systems by changes to the associated radio frequency electronics.

A lens element 204 comprising a rotating lens 1632 is located adjacent the tilted feed aperture 1604. The rotating lens 1632 can be carried by bearings 1636 to allow rotation of the lens 1632 in a plane that is parallel or substantially parallel to the plane of the tilted feed aperture 1604. Moreover, the relationship of the plane in which the rotatable lens 1632 rotates may be fixed with respect to the plane of the tilted feed aperture 1604. In accordance with further embodiments, the rotatable lens is not required to be parallel to the tilted feed aperture 1604. Rotation of the rotatable lens 1632 may be controlled by a motor 1640.

As depicted, a signal that is transmitted along the boresight 1644 of the tilted feed aperture 1604 generally leaves the tilted feed aperture 1604 in a direction that is orthogonal to the plane of the tilted feed aperture 1604. Alternatively, the peak gain of the feed does not need to be aligned with the boresight of the feed aperture 1604. The signal transmitted by the tilted feed aperture 1604 then passes through the rotatable lens 1632, which steers the transmitted signal 1648. A controller 1642 is provided with control information directing the operation of the motors 1620 and 1640. Accordingly, by operating the motors 1620 and 1640, the direction in azimuth of the tilted feed aperture 1604, and the rotation of the rotatable lens 1632 can be controlled. Therefore, as can be appreciated by one of skill in the art after consideration of the present disclosure, a beam produced by the tilted feed aperture 1604 can be scanned in azimuth by rotating the rotating carrier plate 1608. In addition, the beam can be scanned in elevation and azimuth by rotating the rotatable lens 1632. Power and command signals can be passed to the controller 1642 through a slip-ring 1622.

Figure 17:
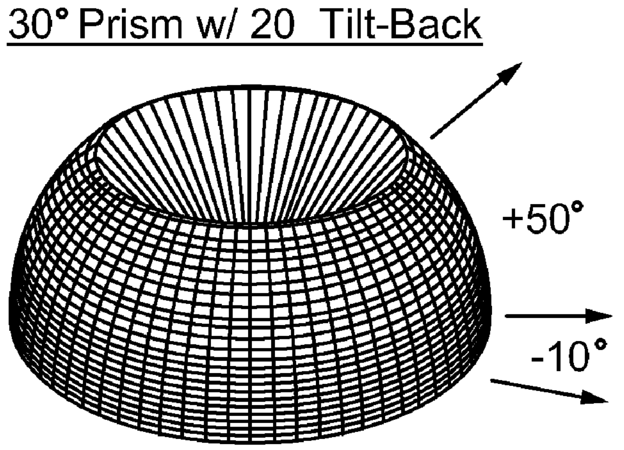
FIG. 17 depicts the scan coverage area obtained with an exemplary embodiment of the system depicted in FIG. 16.

FIG. 17 depicts the coverage area of the antenna assembly 104 of FIG. 16 that can be achieved using an exemplary embodiment of the mechanically steered antenna assembly 1612. In the depicted example, the coverage of the steered beam extends 360° around the rotating axis of the rotating carrier plate 1608, and +50° and −10° in elevation with respect to the plane of the rotating carrier plate 1608. In this example, the tilted feed aperture 1604 is at an angle of 20° with respect to the axis of rotation of the rotating carrier plate 1608, and the rotatable lens 1632 deflects the signal by 30° with respect to the boresight of the tilted feed aperture 1604.

Figure 18:
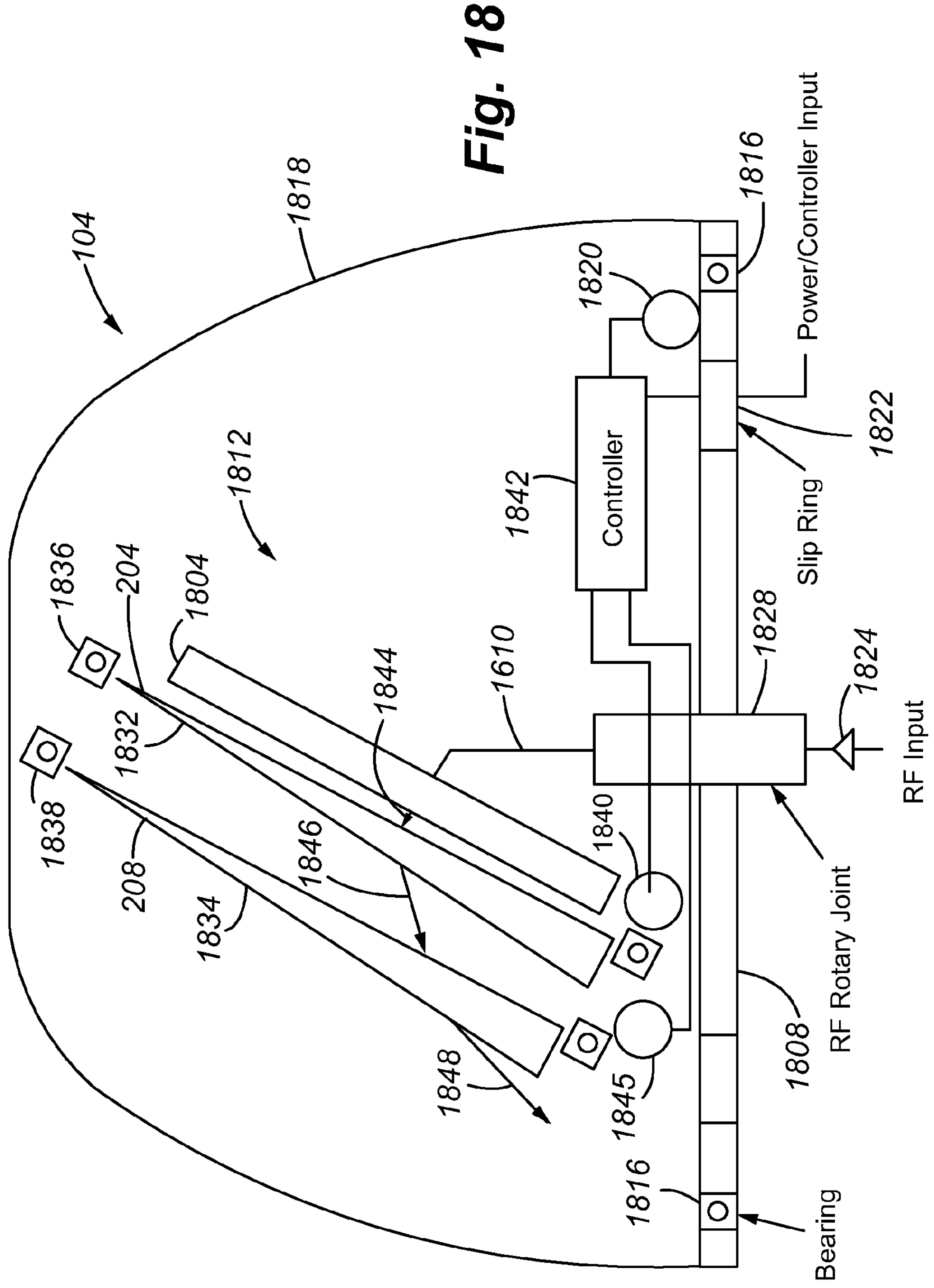
FIG. 18 depicts components of an exemplary antenna incorporating a mechanically steered antenna assembly in accordance with other embodiments of the present invention.

FIG. 18 depicts an antenna assembly 104 incorporating a mechanically steered antenna assembly 1812 in accordance with still other embodiments of the present invention. More particularly, the antenna assembly 104 in FIG. 18 incorporates a mechanically steered antenna assembly 1812 that includes a tilted feed aperture 1804 and first 204 and second 208 lens elements comprising first 1832 and second 1834 rotatable lenses respectively. The feed aperture 1804 may comprise a planar antenna. The antenna assembly 1812 may be covered by a radome 1818. The radome 1818 may be fixed with respect to the vehicle or support structure to which the antenna assembly 104 is interconnected (as shown in FIG. 18), or the radome 1818 can rotate with the carrier plate 1808. The first 1832 and second 1834 rotatable lenses are generally positioned adjacent a tilted feed aperture 1804. More particularly, the first rotatable lens 1832 may be centered and orthogonal to the boresight 1844 of the tilted feed aperture 1804. In addition, the second rotatable lens 1834 may be concentric with and parallel to the first rotatable lens 1832 and the tilted feed aperture 1804. The first rotatable lens 1832 may be carried by a set of bearings 1836 that allow rotation of the first rotatable lens 1832 with respect to the boresight 1844 of the tilted feed aperture 1804. Moreover, the rotation of the first rotatable lens 1832 may be controlled by a motor 1840. Similarly, the second rotatable lens 1834 may be carried by bearings 1838 that allow rotation of the second rotatable lens 1834 with respect to the boresight 1844 of the tilted feed aperture 1804. The rotation of the second rotatable lens 1834 may be controlled by a motor 1845. In general, a beam transmitted along the boresight 1844 of the tilted feed aperture 1804 is steered by the first lens 1832, producing a first steered beam 1846, and is then further steered by the second lens 1834, to produce the transmitted signal 1848.

A rotating carrier plate 1808 may be rotatably mounted to a vehicle or support structure by bearings 1816. Rotation of the rotating carrier plate 1808 may be controlled by a motor 1820. The transmit and/or receive electronics may be located within the radome 1818 or may be externally connected. When externally connected, the tilted feed aperture 1804 may be connected to an amplifier 1824 and/or additional transmit and/or receive electronics via a rotating joint 1828. Moreover, operation of the motors 1820, 1840 and 1845 located within the radome may be at the direction of a controller 1842 that receives power and command signals through a slip-ring 1822.

Figure 19:
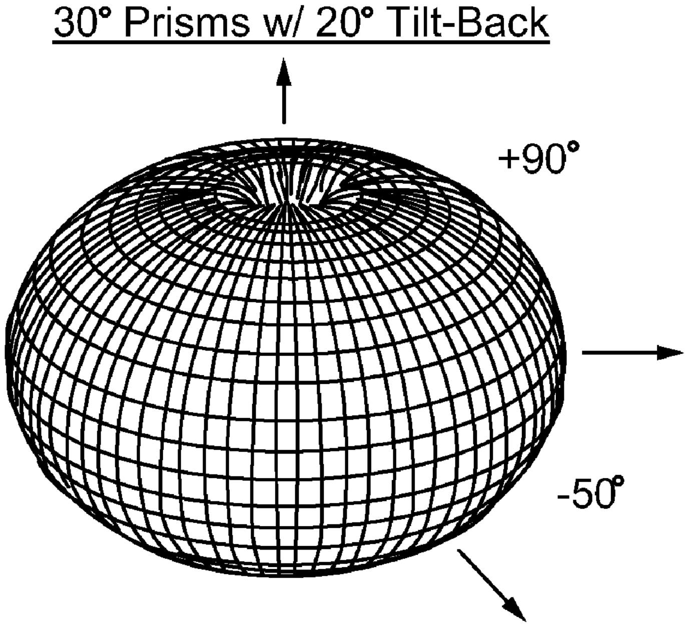
FIG. 19 depicts the scan coverage area obtained with an exemplary embodiment of the system depicted in FIG. 18.

FIG. 19 depicts an exemplary beam coverage area that can be obtained using a mechanically steered antenna assembly 1812 in accordance with embodiments of the present invention. As depicted, the coverage area can extend 360° about the rotation axis of the rotating carrier plate 1808, and −50° to +90° with respect to the plane of the rotating carrier plate 1808. In this example, the tilted feed aperture 1804 is tilted by 20°with respect to the rotation axis of the rotating carrier plate 1808, and the first rotatable lens 1832 and the second rotatable lens 1834 each deflect an incident beam by 30°.

As can be appreciated by one of skill in the art, zoning, in which features of a lens element 204, 208 are repeated, can achieve steering of a beam with a maximum thickness of the lens element 204, 208 that is much less than would otherwise be required. As can also be appreciated by one of skill in the art, the use of zoning introduces physical features at which scattering can occur. More particularly, scattering occurs at the physical discontinuities that are present at the transition from one zone to the next. The scattered waves for a zone structure consisting of features that are repeated at regular intervals add coherently in the far field at angles $\theta_m$ according to $$\sin\theta_m = \sin\theta_i + \frac{m\lambda}{d},$$

where m=0, ±1, ±2, . . . , where $\theta_i$ is the angle of incidence, and where d is the distance between discontinuities. As a result, in a conventional lens element 204, 208 that applies zoning, undesirable side lobes are present.

Figure 20:
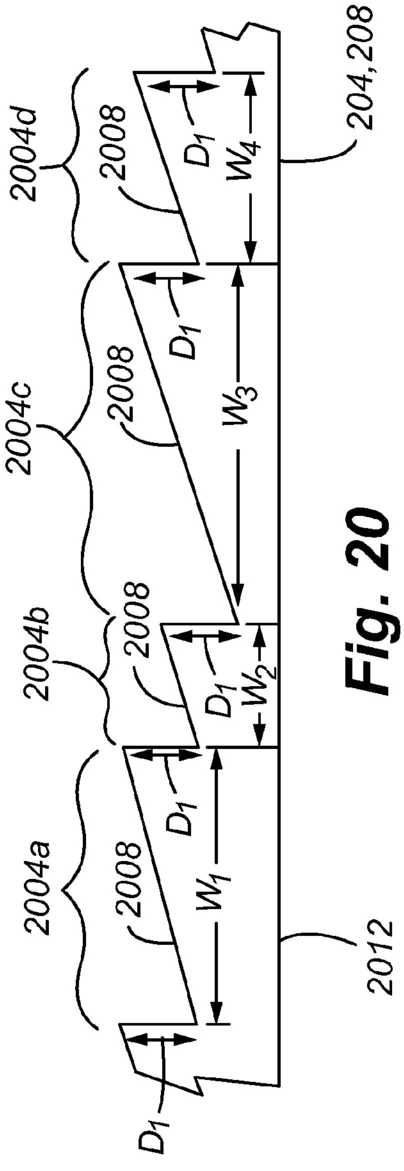
FIG. 20 is a cross-section in elevation of a portion of a lens element in accordance with embodiments of the present invention.

In order to reduce the peak side lobe levels due to scattered energy, the lens elements 204, 208 in FIG. 20 feature varied (e.g. random) zone 2004 widths. The height (distance $D_1$ in the figure) of each of the zones 2004 is an integer multiple of a wavelength of interest. Moreover, each zone 2004 steers an incident beam the same amount. As a result, the zone widths across the aperture are unique and different enough to effectively spread out the side lobe scattered energy in the far field while maintaining the desired steering of the main lobe. This variation or randomization reduces the amount of scattered energy that adds coherently in the far field, although the total scattered energy may not be significantly changed. Impedance matching layers can be placed on the entrance and exit surfaces of the prism. In addition, vertical step surfaces can be metalized in order to improve diffraction efficiency.

FIG. 20 depicts a section of a lens element 204 and/or 208 in elevation. As shown, the lens element 204, 208 includes a number of zones or sections 2004, with sections 2004*a-d* shown. Each of the sections 2004*a-d* has a different width W. For instance, the first section 2004*a* has a width $W_1$, the second section 2004*b* has a width $W_2$, the third section 2004*c* has a width $W_3$, and the fourth section 2004*d* has a width $W_4$. However, the distance $D_1$ from the maximum height of one section 2004 to the minimum height of the next section, where the maximum and minimum heights under consideration are immediately adjacent one another, is the same for each section 2004. Moreover, the slopes of the surfaces 2008 are at the same angle with respect to the plane 2012 of the lens element 204, 208.

Figure 21:
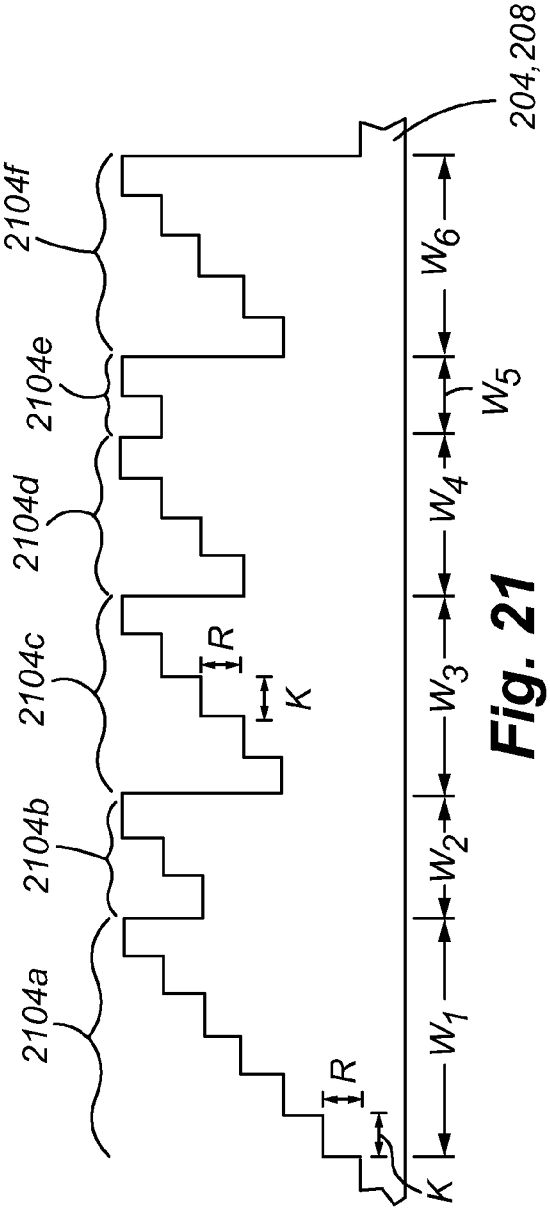
FIG. 21 is a cross-section in elevation of a portion of a lens element in accordance with other embodiments of the present invention.

FIG. 21 illustrates lens elements 204, 208 in accordance with still other embodiments of the present invention. In this embodiment, the lens elements 204, 208 incorporate zones 2104 that comprise a stepped dielectric. More particularly, the number of steps included in each zone 2104 may be different from that of a neighboring zone. However, the rise R and width K of each step is the same throughout the lens element 204, 208. As a result, the different zones 2104 each steer an incident beam by the same amount. As with the zones 2004 in the embodiment of FIG. 20, the provision of zones with different widths W has the effect of spreading out the scattered energy in the far field, to prevent or reduce the creation of undesirable side lobes.

Figure 23:
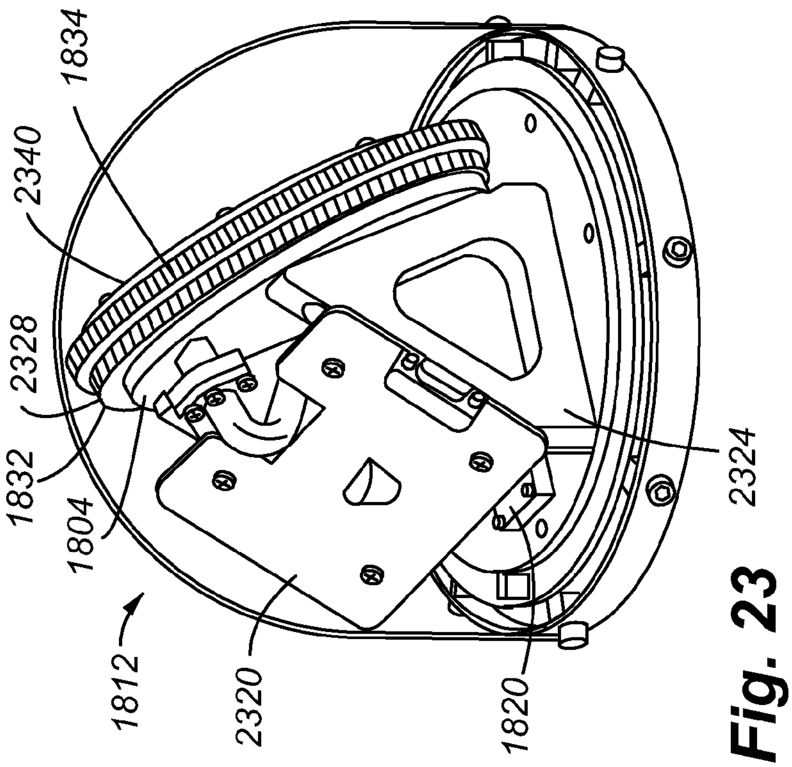
FIG. 23 is another perspective view of a mechanically steered antenna assembly in accordance with embodiments of the present invention.
Figure 22:
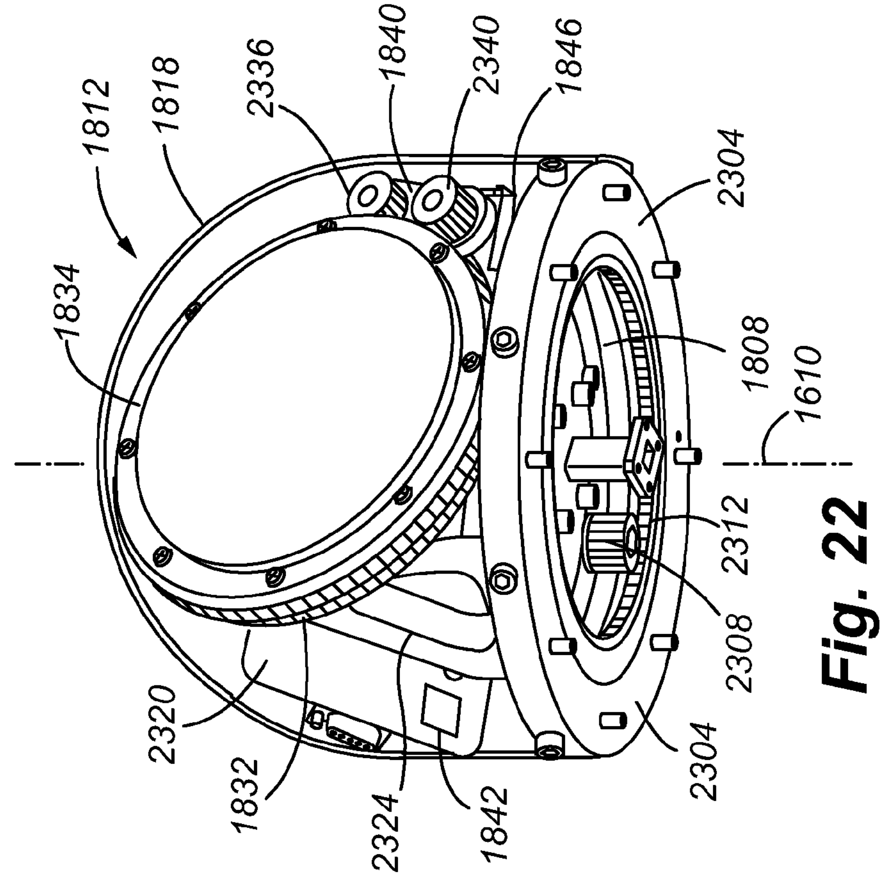
FIG. 22 is a perspective view of a mechanically steered antenna assembly in accordance with embodiments of the present invention.

FIGS. 22 and 23 present different views of a mechanically steered antenna assembly 1812 in accordance with embodiments of the present invention. In particular, FIG. 22 illustrates the mechanically steered antenna assembly 1812 from a bottom perspective view, while FIG. 23 illustrates the mechanically steered antenna assembly 1812 from a top perspective view. In general, the mechanically steered antenna assembly 1812 includes a rotating carrier plate 1808 that is mounted to a base 2304. The rotation of the carrier plate 1808 may be controlled by a motor 1820 that powers a pinion gear 2308 acting on a ring gear 2312 mounted to the base 2304. Accordingly, operation of the motor 1820, for example under the control of a controller 1842 mounted to a circuit board 2320, can be used to rotate the feed aperture 1804 relative to an axis of rotation 1610, and thus point the beam produced by the feed aperture 1804 in azimuth.

Support brackets 2324 support the feed aperture 1804 and the circuit board 2320. As shown, the surface of the support brackets 2324 to which the feed aperture 1804 is interconnected is at an angle with respect to the axis 1610 about which the rotating carrier plate 1808 rotates, with the effect that the feed aperture 1804 is tilted in elevation.

A first lens element 1832 is mounted to the feed aperture 1804. In the illustrated embodiment, the feed aperture 1804 is a planar antenna element. The first rotatable lens element 1832 is mounted such that it is parallel to the feed aperture 1804. Similarly, a second rotatable lens element 1834 is mounted to the first lens element 1832 such that it is parallel to the first lens element 1832 and the feed aperture 1804. A ring gear 2328 is provided an outside diameter of the first lens element 1832. The ring gear 2328 is acted on by a pinion gear 2336 connected to a motor 1840 operated under the control of the controller 2316. Similarly, a ring gear 2340 on the second lens element 1834 is operated on by a second pinion gear 2344 that is turned by a motor 1846 under the control of the controller 2316. Accordingly, both the first rotatable lens element 1832 and the second rotatable lens element 1834 can be rotated in planes that are parallel to a plane containing or defining the feed aperture 1804. In addition, the components of the mechanically steered antenna assembly 1812 are contained within a package defined by a radome 1818 that is interconnected to the base 2304. Therefore, all of the moving components of the mechanically steered antenna assembly 1812 are contained within a protective housing that is fixed with respect to the vehicle or other structure to which the mechanically steered antenna assembly 1812 is interconnected.

Lens elements 204, 208 as illustrated in FIGS. 20 and 21 can be incorporated into embodiments featuring one lens element or multiple lens elements as part of a mechanical steering assembly 112. Moreover, lens elements 204, 208 incorporating random or different zone widths from zone to zone can be incorporated into antenna assemblies 104 having tilted feed apertures 1604, 1804 in combination with one 1632 or two 1832 and 1834 rotatable lens elements.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method of directing a beam, comprising:
- generating a beam, wherein the beam has a first direction of travel;
- receiving the beam at a first rotatable lens element, wherein the first rotatable lens element has at least first and second zones, and wherein the first zone has a different width than the second zone;
- steering by the first zone of the first rotatable lens element a first discrete portion of the beam by a first amount; and
- steering by the second zone of the first rotatable lens element a second discrete portion of the beam by the first amount, wherein after steering the beam by the first amount by the first and second zones of the first rotatable lens element, the beam has a second direction of travel.

2. The method of claim 1, wherein generating a beam includes generating a beam from a radiating element that is at a first angle with respect to a first axis of rotation, wherein the radiating element is rotatable about the first axis of rotation.

3. The method of claim 2, wherein rotating the radiating element with respect to the first axis of rotation steers the beam in azimuth, and wherein rotating the first rotatable lens steers the beam in azimuth and elevation.

4. The method of claim 1, wherein the zones of the first rotatable lens element each comprise a prism element.

5. The method of claim 1, wherein the zones of the first rotatable lens element each comprise a set of steps.

6. The method of claim 1, wherein the zones of the first rotatable lens element each comprise a set of pairs of radiating elements, wherein at least a first delay line interconnects each pair of radiating elements.

7. The method of claim 1, further comprising:
- passing the beam from the first rotatable lens element to a second rotatable lens element;
- receiving the beam having the second direction of travel at the second rotatable lens element; and
- steering the beam by a second amount.

8. The method of claim 7, wherein the second rotatable lens element has at least first and second zones, and wherein the first zone has a different width than the second zone.

9. The method of claim 8, wherein the zones of the second rotatable lens element each comprise a prism element.

10. The method of claim 8, wherein the zones of the second rotatable lens element each comprise a set of steps.

11. The method of claim 8, wherein generating a beam includes generating a beam from a radiating element that is at a first angle with respect to a first axis of rotation wherein the radiating element is rotatable about the first axis of rotation, the method further comprising:
- rotating the radiating element about the first axis of rotation, wherein the beam is steered in azimuth;
- rotating the first rotatable lens element relative to the radiating element, wherein the beam is steered in azimuth and elevation;
- rotating the second rotatable lens element, wherein the beam is steered in elevation and azimuth.

12. The method of claim 11, wherein the radiating element, the first rotatable lens element, and the second rotatable lens element are parallel to one another and are at a first angle with respect to an axis of rotation of the radiating element.

13. The method of claim 12, wherein the radiating element, the first rotatable lens element, and the second rotatable lens element are mounted to a first structure, and wherein the radiating element, the first rotatable lens element, and the second rotatable lens element are contained within a radome that is fixed to the structure.

14. An antenna system, comprising:
- a base;
- a feed aperture, wherein the feed aperture is rotatable about a first axis with respect to the base, and wherein the feed aperture is tilted with respect to the first axis;
- a first rotatable lens element mounted adjacent the feed aperture, comprising:
  - a first zone, wherein the first zone is operable to steer a first portion of a beam received by the first rotatable lens element by a first amount, wherein the first zone has a first width;
  - a second zone, wherein the second zone is operable to steer a second portion of the beam or received by the first rotatable lens element by the first amount, wherein the second zone has a second width, and wherein the first and second widths are different.

15. The system of claim 14, wherein the first zone includes a first number of steps, and wherein the second zone includes a second number of steps.

16. The system of claim 14, further comprising:
- a second rotatable lens element mounted adjacent the first rotatable lens element, comprising:
  - a first zone, wherein the first zone is operable to steer a first portion of a beam received by the second rotatable lens element by a second amount, wherein the first zone has a first width;
  - a second zone, wherein the second zone is operable to steer a second portion of the beam received by the second rotatable lens element by the second amount, wherein the second zone has a second width, and wherein the first and second widths are different.

17. The system of claim 14, further comprising:

a radome fixed with respect to the base, wherein the feed aperture and the first rotatable lens element are housed within the radome.

18. The system of claim 14, further comprising:

a second rotatable lens element;

a radome fixed with respect to the base, wherein the feed aperture, the first rotatable lens element, and the second rotatable lens element are housed within the radome.

19. A mechanically steered antenna, comprising:

a base;

a controller;

a feed aperture rotatably mounted to the base, wherein the feed aperture can rotate about a first axis, and wherein the feed aperture is tilted in elevation;

a first motor, wherein the first motor is operated by the controller to rotate the feed aperture about the first axis;

a first rotatable lens, wherein the first rotatable lens includes a plurality of zones, wherein each of the plurality of zones has a width that is different than a width of an adjacent zone, and wherein each of the plurality of zones steers a beam by a first amount, wherein the first rotatable lens is rotatable with respect to the feed aperture, and wherein the first rotatable lens is orthogonal to a beam produced by the feed aperture;

a second motor, wherein the second motor is operated by the controller to rotate the first rotatable lens about an axis defined by the beam produced by the feed aperture.

20. The antenna of claim 19, further comprising:

a second rotatable lens, wherein the second rotatable lens includes a plurality of zones, wherein each of the plurality of zones has a width that is different than a width of an adjacent zone, and wherein the second rotatable lens lies within a plane that is parallel to a plane that the first rotatable lens lies in, wherein the second rotatable lens is rotatable with respect to the first rotatable lens and the feed aperture;

a third motor, wherein the third motor is operated by the controller to rotate the second rotatable lens about the axis defined by the beam produced by the feed aperture.

* * * * *

UNITED STATES PATENT AND TRADEMARK OFFICE

CERTIFICATE OF CORRECTION

PATENT NO. : 8,068,053 B1
APPLICATION NO. : 12/638782
DATED : November 29, 2011
INVENTOR(S) : Stutzke et al.

It is certified that error appears in the above-identified patent and that said Letters Patent is hereby corrected as shown below:

In Claim 14
Column 24,
Line 52, delete "or".

Signed and Sealed this
Tenth Day of January, 2012

David J. Kappos
*Director of the United States Patent and Trademark Office*